US010518714B2

(12) United States Patent
Masanek, Jr.

(10) Patent No.: US 10,518,714 B2
(45) Date of Patent: Dec. 31, 2019

(54) CARGO ORGANIZER WITH HAND-ROTATABLE CAMMING FINGERS

(71) Applicant: MacNeil IP LLC, Bolingbrook, IL (US)

(72) Inventor: Frederick W. Masanek, Jr., Barrington, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 85 days.

(21) Appl. No.: 15/962,499

(22) Filed: Apr. 25, 2018

(65) Prior Publication Data

US 2019/0329714 A1  Oct. 31, 2019

(51) Int. Cl.
| | |
|---|---|
| *B60P 7/08* | (2006.01) |
| *B60R 11/00* | (2006.01) |
| *B65D 6/34* | (2006.01) |
| *B60P 7/135* | (2006.01) |
| *B60R 5/04* | (2006.01) |
| *B60R 7/00* | (2006.01) |
| *B60R 9/00* | (2006.01) |
| *B60R 9/06* | (2006.01) |
| *B60P 7/10* | (2006.01) |
| *B60R 5/00* | (2006.01) |

(52) U.S. Cl.
CPC ............ *B60R 11/00* (2013.01); *B60P 7/0892* (2013.01); *B60P 7/10* (2013.01); *B60P 7/135* (2013.01); *B60R 5/00* (2013.01); *B60R 5/04* (2013.01); *B60R 7/00* (2013.01); *B60R 9/00* (2013.01); *B60R 9/06* (2013.01); *B60R 9/065* (2013.01); *B65D 11/22* (2013.01); *B60R 2011/0003* (2013.01); *B60R 2011/004* (2013.01); *B60R 2011/005* (2013.01); *B60R 2011/0064* (2013.01); *B60R 2011/0082* (2013.01)

(58) Field of Classification Search
CPC .. B60R 11/00; B60R 7/00; B60R 5/04; B60R 9/065; B60R 9/00; B60R 5/00; B60R 9/06; B60R 2011/004; B60R 2011/005; B60R 2011/0064; B60R 2011/0082; B60R 2011/003; B60P 7/135; B60P 7/10; B60P 7/0892; B65D 11/22
USPC .............. 410/90, 91, 94, 95, 121, 155; 224/403–404, 42.33; 248/351, 357
See application file for complete search history.

(56) References Cited

U.S. PATENT DOCUMENTS

| | | | |
|---|---|---|---|
| 4,842,460 A * | 6/1989 | Schlesch ............... | B60P 7/0892 410/121 |
| 9,248,783 B2 | 2/2016 | Thom et al. | |
| D772,142 S | 11/2016 | Masanek, Jr. et al. | |
| 2014/0093323 A1* | 4/2014 | Malmstrom ............ | B60P 7/135 410/121 |

* cited by examiner

*Primary Examiner* — Stephen T Gordon
(74) *Attorney, Agent, or Firm* — Perkins IP Law Group LLC; Jefferson Perkins

(57) ABSTRACT

Four cargo organizers may be formed into a cargo containment system using boards of one or two standard sizes of milled lumber and of varying lengths. To attach a board to a cargo organizer, a bottom of the board is placed on a sill that extends rearwardly of a cargo organizer wall. The board is rotated upwardly until its width is in a vertical position. Then, each of plural camming fingers is turned within a respective finger hole, the holes being selected by the user for the width of the board in question. An elongate blade of each camming finger helps affix the top of the board to a rear face of the organizer wall.

17 Claims, 21 Drawing Sheets

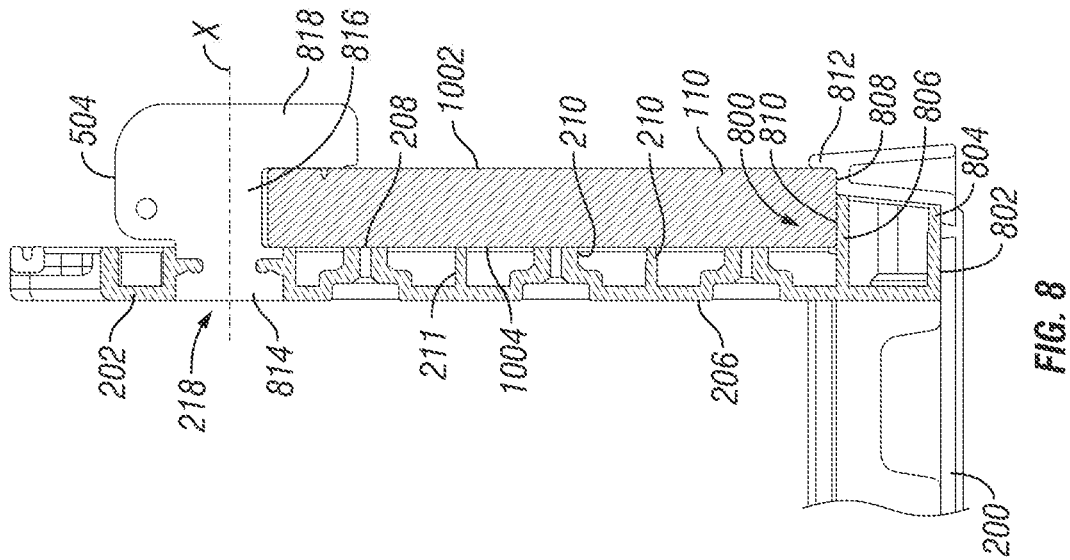
FIG. 8
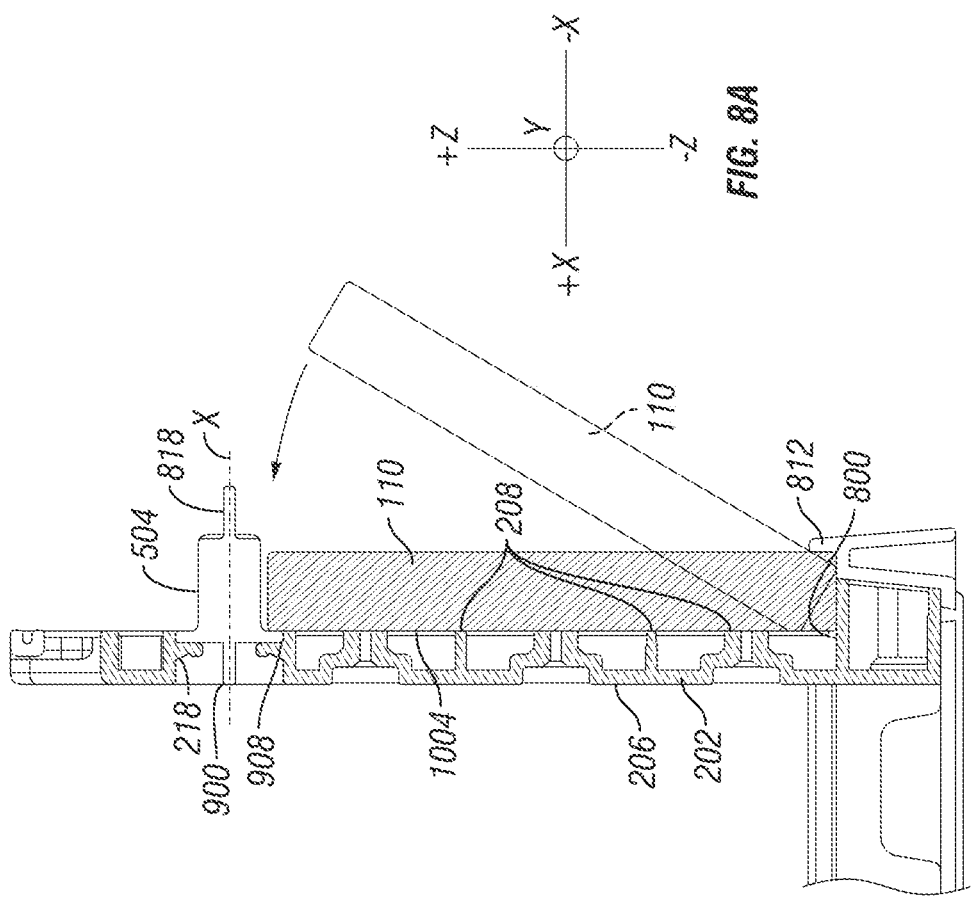
FIG. 8A
FIG. 11

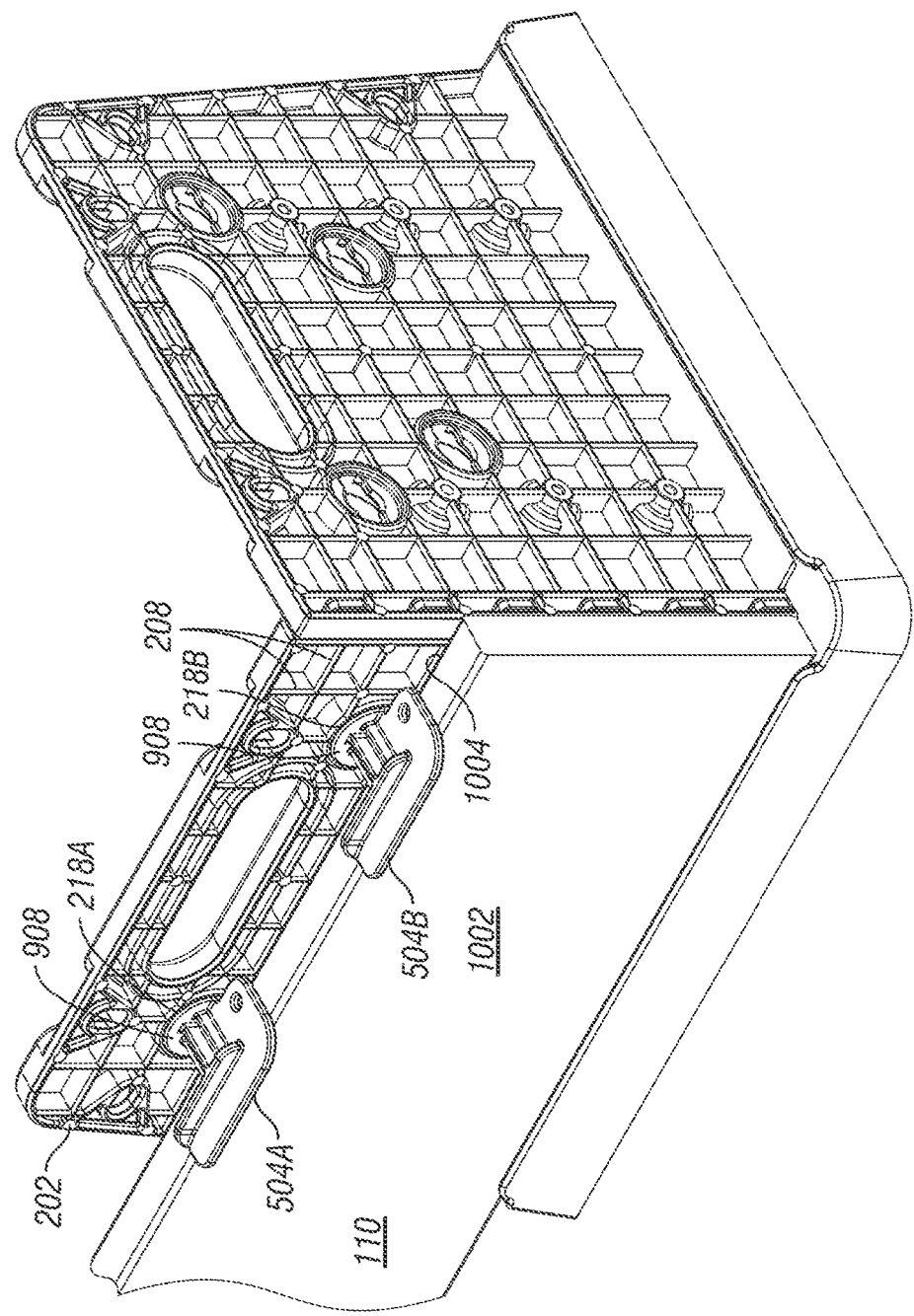

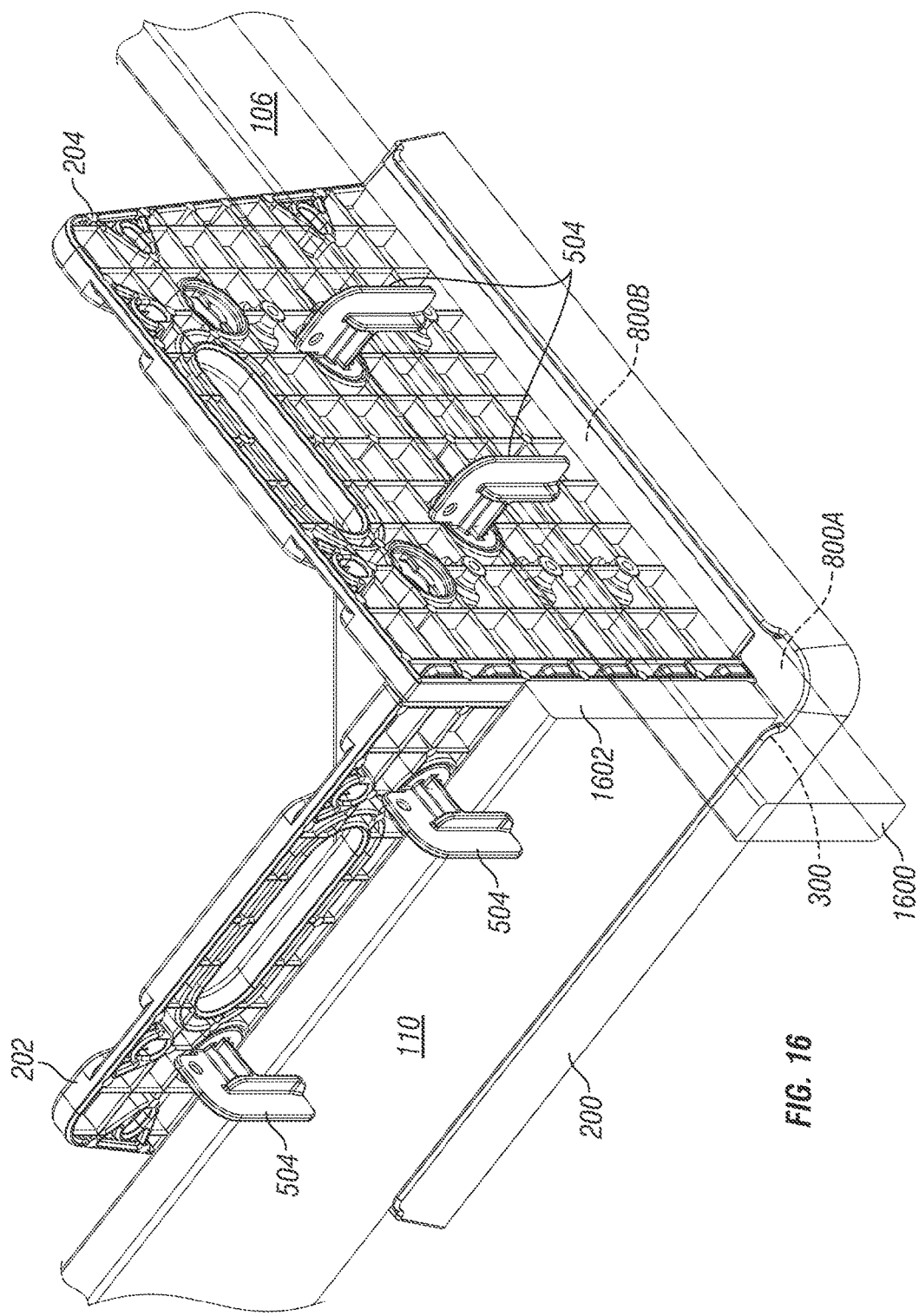

CARGO ORGANIZER WITH HAND-ROTATABLE CAMMING FINGERS

BACKGROUND OF THE INVENTION

Cargo holds of pickup trucks, minivans and other vehicles usually have flat, undivided areas that are typically much larger than the bottom areas of the articles that the cargo holds receive. Vehicles often experience forward, backward or side-to-side acceleration during travel. When this happens, the article(s) placed in the cargo hold (such as a trunk or truck bed) will have a tendency to slide. If the acceleration is strong enough, the article may impact the side of the cargo hold, may tip over, or may hit other articles in the cargo hold, all possibly causing damage to the article, to other articles or to the vehicle.

To mitigate this damage, cargo organizers have been designed that restrain the article(s) from sliding. One such cargo organizer is disclosed in U.S. Pat. No. 9,248,783 B2, assigned to the Applicant hereof. This cargo organizer has a base and two upstanding walls formed at right angles to each other and to the base, forming a three-sided corner. Four such cargo organizers are used to nest the article or articles to be restrained. The bottom surface of the base has an enhanced coefficient of friction and surface area contact with the cargo hold substrate, both of which greatly enhance the resistance to sliding forces. The cargo organizer also enhances the resistance to forces tending to tip over the restrained article.

U.S. Pat. No. 9,067,521 B1, assigned to the Applicant hereof, discloses a cargo organizer for larger, heavier articles, in which four corner units are assembled together using boards into a cargo containment system. The entire disclosure and drawings of the last mentioned patent (hereinafter, the "'521 Patent") are fully incorporated by reference herein. The Applicant has now invented improvements to this cargo organizer that reduce its "footprint", make it more versatile, and enhance its ability to be assembled by hand into a multiple-organizer cargo containment system.

SUMMARY OF THE INVENTION

The present invention provides a cargo organizer that is adapted to be assembled to at least one board in the construction of a cargo containment system. The organizer has a vertical wall with a front or inner surface that is adapted to receive an item of cargo, and an outer surface rearwardly spaced from the inner surface. A board channel extends rearwardly from the outer surface of the vertical wall and defines an upwardly facing surface for receiving the board. A finger hole is formed along an axis and extending from the outer surface of the vertical wall to an inner surface of the wall. A height of the axis as measured from the upwardly facing surface of the board channel is greater than a predetermined width of the board, which can be of a standard milled size.

A finger is inserted into the finger hole and may be rotated around the axis by the user from a disengaged position to an engaged position. The finger has a forward portion that extends forwardly into the finger hole from the outer surface of the vertical wall, a central portion that extends rearwardly from the outer surface of the vertical wall, and a blade portion joined to the central portion and extending rearwardly from the central portion.

The central portion of the finger has a thickness from the axis that is no more than a predetermined radius, throughout an axial sector that extends for at least 90 degrees around the axis and that includes a predetermined radial direction. An axial length of the central portion is greater than a predetermined board thickness. The blade portion has a radial length that is greater than the predetermined radius. The blade portion has a width across the axis, at a right angle to its length, which is no greater than twice the predetermined radius. Therefore, when the finger is rotated such that the predetermined radial direction is aligned with the horizontal, the board may be installed in the board channel or moved. But when the finger is rotated such that the predetermined radial direction is pointed downward, the board will be captured between the blade portion and the outer surface of the wall, affixing the board to the cargo organizer.

In one embodiment, there are provided multiple fingers for insertion in respective finger holes. In one embodiment, the finger holes may be formed on axes that are at different heights as measured from the upwardly facing surface of the board channel; these finger holes are used alternatively to each other, to assemble the cargo organizer to boards of different widths. In one embodiment, the cargo organizer has first and second finger holes whose axes are at the same height from the upwardly facing surface of the board channel, such that a board of a predetermined width may be affixed to the cargo organizer in two places. In one embodiment, at least first and second finger holes are formed through the vertical wall at a first height, and third and fourth finger holes are formed through the vertical wall so that their axes are at a second, lower height. If the cargo organizer is to be assembled to a board of a first milled size (say, a 1×6), the user inserts the fingers into the first and second finger holes. If the cargo organizer is to be assembled to a board of a second milled size (say, a 1×4), the user inserts the fingers into third and fourth finger holes.

In one embodiment, a forward portion of the finger includes a t-bar with a rearward-facing surface. The t-bar is insertable through an elongate slot that communicates the exterior surface of the vertical wall with the interior surface of the vertical wall. When the finger is rotated by a predetermined amount after it is inserted through the slot, a detent formed on the rearward-facing surface of the t-bar engages with a detent, of complementary shape, that is formed on the interior surface of the vertical wall. In one embodiment, the t-bar has two arms, with two respective rearward-facing surfaces, each of which has a detent that respectively cooperates with one of two detents formed on the interior surface of the vertical wall. In one embodiment, the interior surface of the vertical wall has a general interior surface and a recess formed around the finger hole axis and extending rearwardly from the general interior surface. The wall detent(s) are formed on a floor of the recess.

In one embodiment, the blade portion of the finger has a rearward flange that is substantially oriented in a plane orthogonal to the axis. A board-engaging tooth extends forwardly from a forward facing surface of this rearward flange. The tooth is elongate in a direction tangential to the axis, and its first and second opposed ends may be ramped so that the degree of interference of the tooth with the side of the board that it contacts gradually increases as the blade portion is rotated to a downward position.

In one embodiment, the cargo organizer includes first and second vertical walls having first ends joined together such that the vertical walls are at an angle to each other. Bottoms of the first and second vertical walls may be joined to a substantially triangular base, first and second sides of which are respectively disposed near the first and second walls. A third side of the triangular base extends from a free end of the first vertical wall to a free end of the second vertical wall, and is substantially straight. The substantially triangular form of the base permits the cargo organizer to be used with a like cargo organizer to cage or nest a round container such as a five-gallon bucket.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 8 is a cross-sectional view taken through a base, vertical wall and finger of a cargo organizer, shown affixing a board;

FIG. 8A is a diagram of a frame of reference used to describe the illustrated embodiment of the invention;

FIG. 11 is a sectional view similar to that shown in FIG. 8, showing a finger, organizer wall and board prior to the affixation of the board to the cargo organizer;

FIGS. 14A-14E are perspective top rear views of successive stages of assembling a board to a cargo organizer;

FIG. 16 is a top rear perspective view showing the assembly of the cargo organizer to two boards.

DETAILED DESCRIPTION

Figure 1:
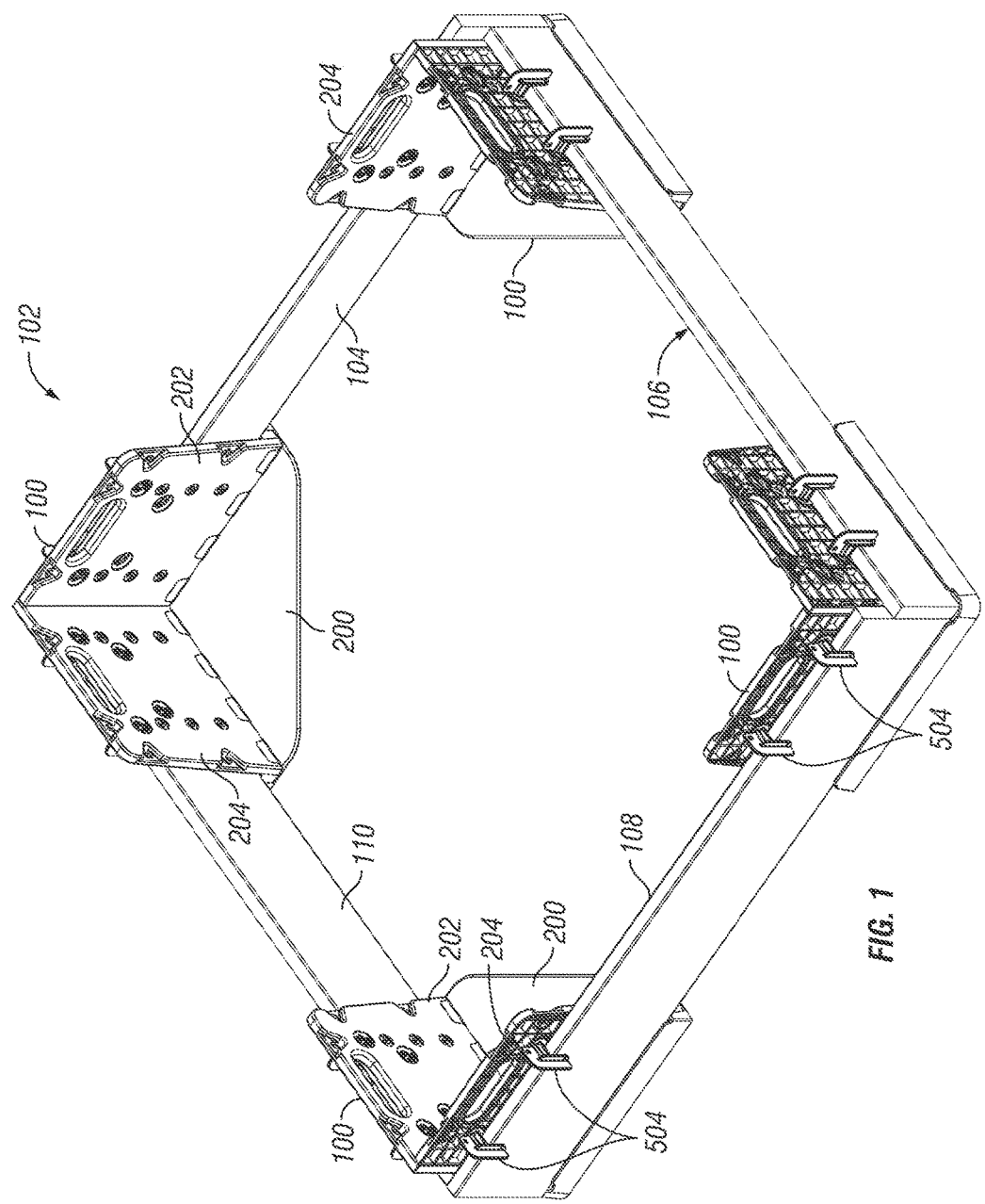
FIG. 1 is a top perspective view showing four cargo organizers as assembled with two sizes of standard lumber into a cargo containment system.

As shown in FIG. 1, four cargo organizers 100 according to the invention may be assembled into a cargo containment system 102 by the use of standard-size lumber pieces 104-110. In the illustrated example, two of the boards (104, 106) are nominally 1×4 inches (as milled, ¾"×3½") and two of the boards (108, 110) are nominally 1×6 inches (as milled, ¾"×5½"). The illustrated embodiment can accommodate one, two, three or four boards of either of these standard softwood sizes. Other embodiments (not shown) could be devised to accommodate boards of other standard sizes. Another nonillustrated embodiment would be able to accommodate three or more standard lumber sizes by providing additional sets of finger holes (two such sets per organizer are described below).

Figure 2:
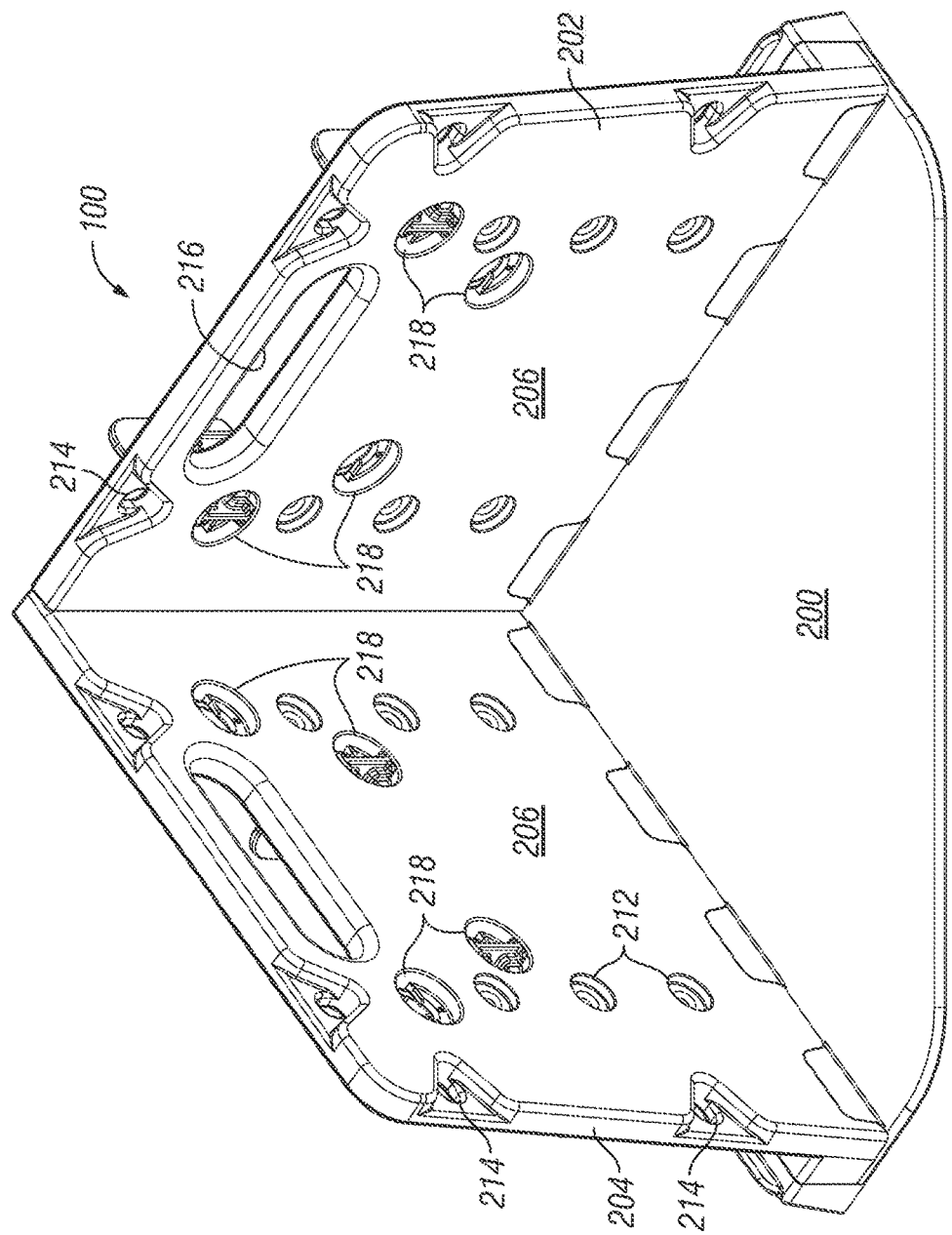
FIG. 2 is a perspective view, taken from the front and above, of a cargo organizer according to the invention.
Figure 3:
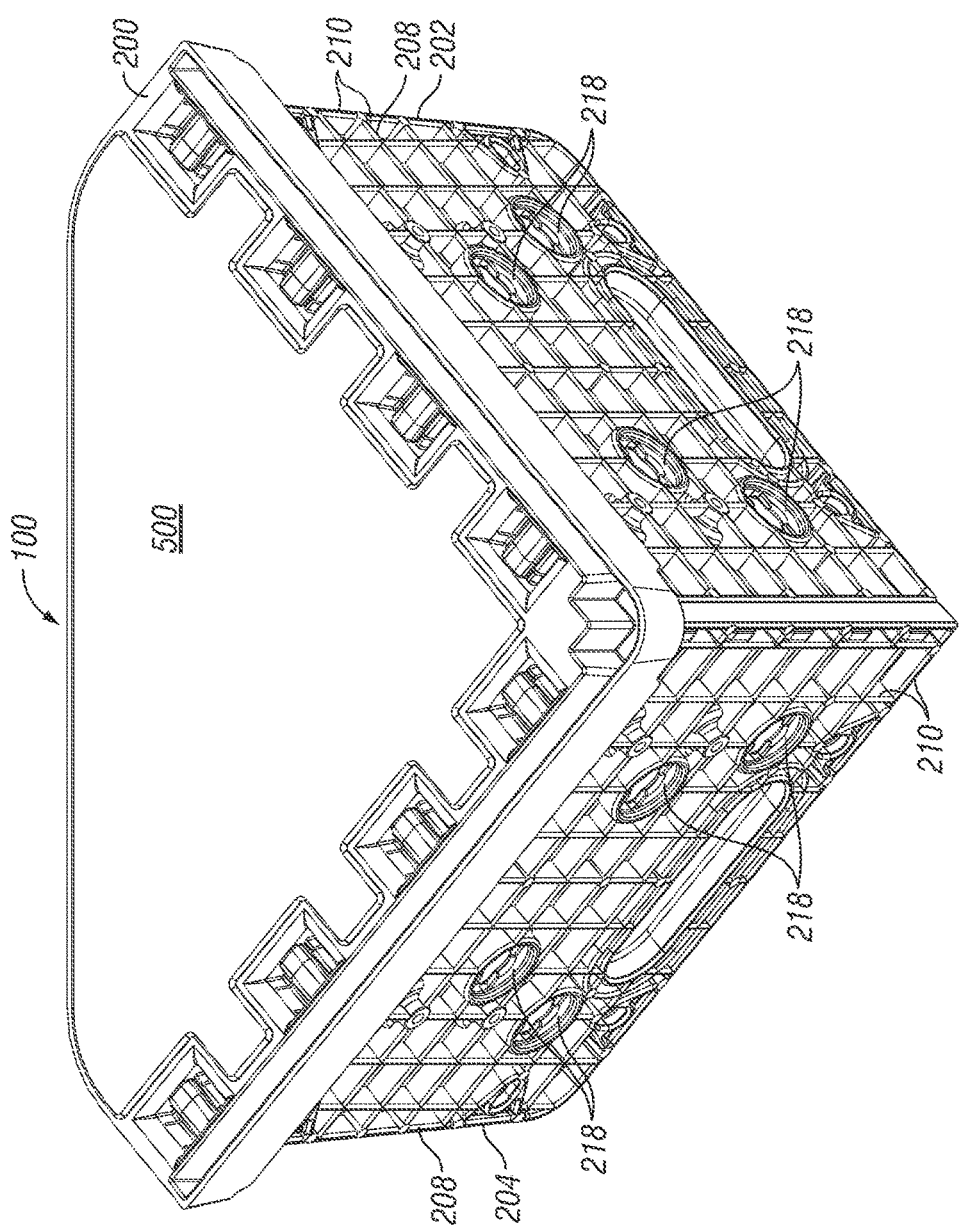
FIG. 3 is a perspective view, taken from the rear and below, of the cargo organizer shown in FIG. 2.
Figure 4:
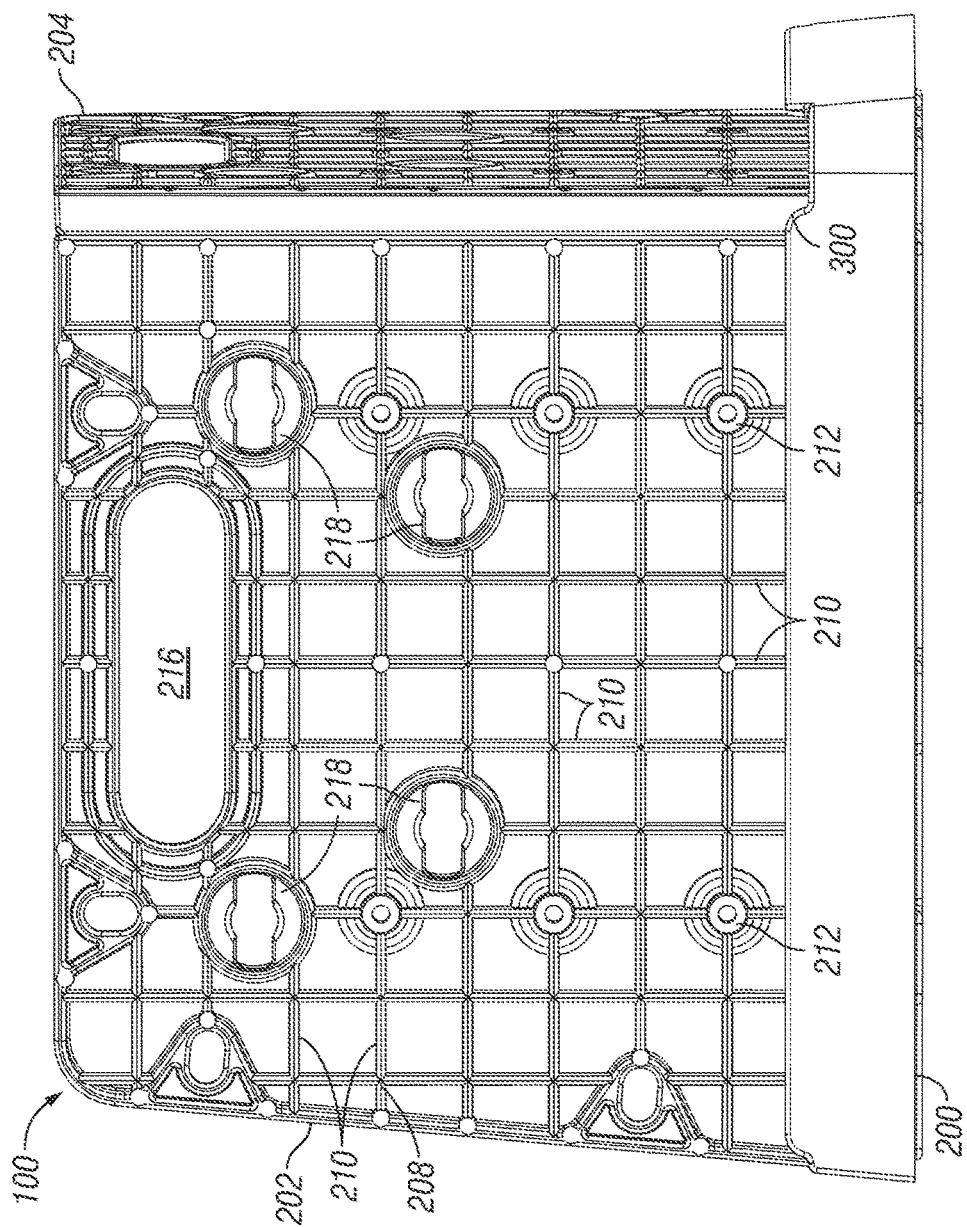
FIG. 4 is an outer side view of the cargo organizer shown in FIG. 2.

FIGS. 2, 3 and 4 illustrate a single cargo organizer 100 in more detail. In general, the organizer 100 is similar in construction to the organizer disclosed in the '521 Patent. The skilled person is referred to the '521 Patent for compositional and structural details that the illustrated embodiment has in common with the organizer disclosed in the '521 Patent, such as how the base and walls are separately molded and from which polymers, how the walls and base are joined together, and how a layer of elastomer may be overmolded onto the bottom of the base to enhance frictional forces.

The organizer 100 may have a base 200 and, upstanding from the base 200, a first vertical wall 202 and a second vertical wall 204. Base 200, wall 202 and wall 204 may be joined together using the method and structure shown in the '521 Patent. The '521 Patent describes a base and vertical walls that are separately molded and then snapped or fastened together, but these three organizer structural components could instead be integrally molded, or otherwise fabricated and then joined. In the illustrated embodiment, wall 202 is at right angles to wall 204, although this angle could be varied in other embodiments; for example, the walls 202, 204 could be disposed at 60 degrees to each other, so as to fit to a wedge-shaped or triangular article, or could be disposed at 120 degrees to each other, so as to best fit to e.g. a regular hexagonal object.

Each wall 202, 204 has a vertically disposed interior or front surface 206 that in the illustrated embodiment is substantially continuous. Surface 206 is adapted to be placed against an article or articles to be restrained. Each wall 202, 204 further has a vertically disposed exterior or rear surface 208 that, in the illustrated embodiment, is not continuous. The exterior surface 208 of wall 202 terminates in a predetermined plane, displaced from and parallel to interior or front surface 206. The exterior or rearward surface 208 is composed and defined by the rearward limits or ends of a plurality of rearwardly extending ribs 210. The ribs 210 extend rearwardly from a web 211 (better seen in FIG. 8) that makes up the front or interior surface 206. Most of the ribs 210 are either horizontal or vertical and intersect each other in a rectilinear grid pattern. However, some of the ribs 210 are ring-shaped and surround holes made through the wall 202, some of which will be described below.

The front or interior surface 206 of each wall 202, 204 may have plural screw holes 212, holes 214 for knotted ropes, hooks or other fasteners, a handle hole 216 and, importantly, a plurality of spaced-apart fastener or finger holes 218.

Figure 5:
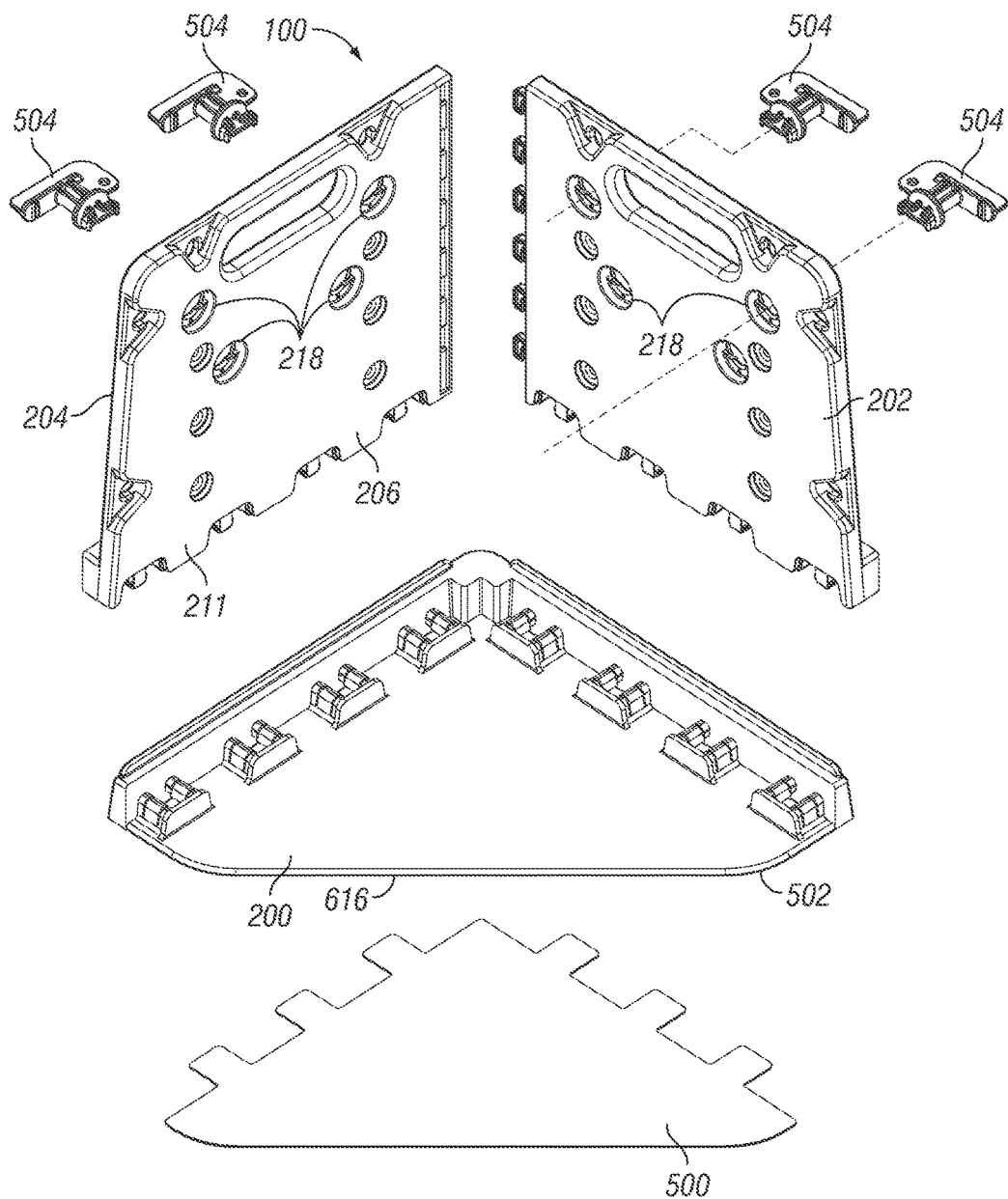
FIG. 5 is an exploded perspective view, taken from a top front point of view, of the cargo organizer shown in FIG. 2.

As seen in FIG. 5, the walls 202 and 204 may be snapped into the base 200 as further described in the '521 Patent. A bottom layer 500 may be overmolded onto the bottom of a base substrate 502. The bottom layer 500 is selected to have a high coefficient of friction and may be a thermoplastic elastomer (TPE). The cargo organizer also comes equipped with at least one, and in the illustrated embodiment four, fingers 504 of identical shape and size. The fingers 504 are here shown in a horizontal orientation, prior to their insertion into selected ones of the finger holes 218 and prior to their rotation to assemble one or more boards to the organizer 100.

Figure 6:
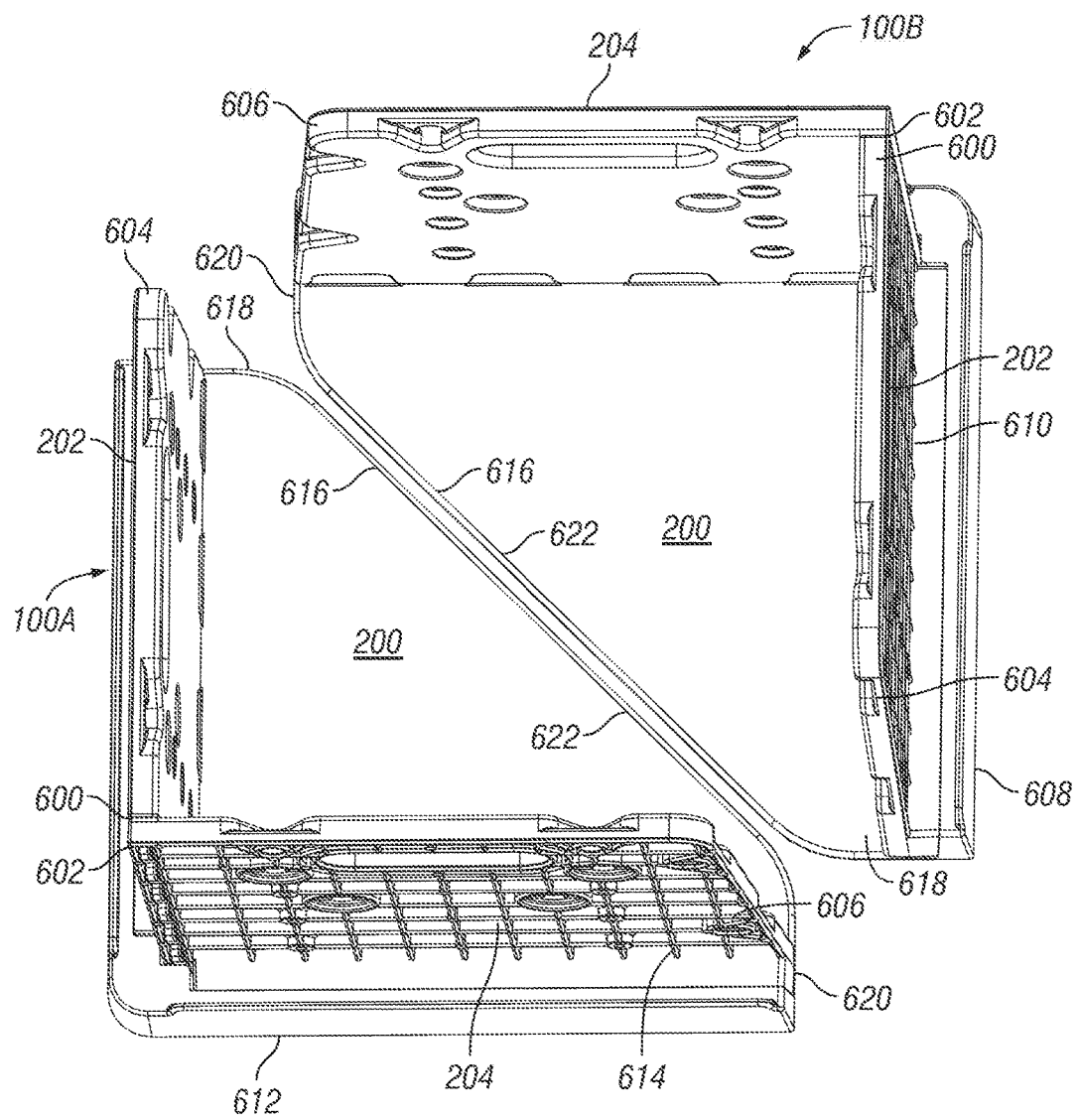
FIG. 6 is a top perspective view of two cargo organizers being positioned to cage a small cargo item.

While organizers 100 are adapted for use with boards, they can also be used by themselves. For example, in order to cage an article of limited size such as a square box (not shown), a first cargo organizer 100A may be placed so as to face and abut a second cargo organizer 100B (FIG. 6). This is made possible by the shape of the base 200. Vertical wall 202 has a first transverse end 600 that is joined to a first transverse end 602 of vertical wall 204. Vertical wall 202 has a free transverse end 604 opposed to end 600, and vertical wall 204 has a free transverse end 606 that is opposed to end 602.

The base 200 is substantially triangular in shape. A first side 608 of base 200 is disposed near to and parallel to a bottom 610 of the vertical wall 202. A second side 612 of the base 200 is disposed near to and parallel to a bottom 614 of the vertical wall 204. In the illustrated embodiment, a third side 616 of the base 200 extends from a location near free wall end 604 to a location near free wall end 606. The third side 616 has a convexly curved segment 618 that proceeds from free end 606 and at right angles to side 608, and a convexly curved segment 620 that proceeds from free end 604 and at right angles to side 612. A middle segment 622 of the side 616 joins segments 618 and 620 together, is straight and is disposed at a 45 degree angle to sides 608, 612, and is long relative to the shorter curved segments 618 and 620. The overall character of third side 616 is therefore substantially that of a diagonal and straight side that may be placed to adjoin a similar side 616 of a neighboring cargo organizer.

Figure 7:
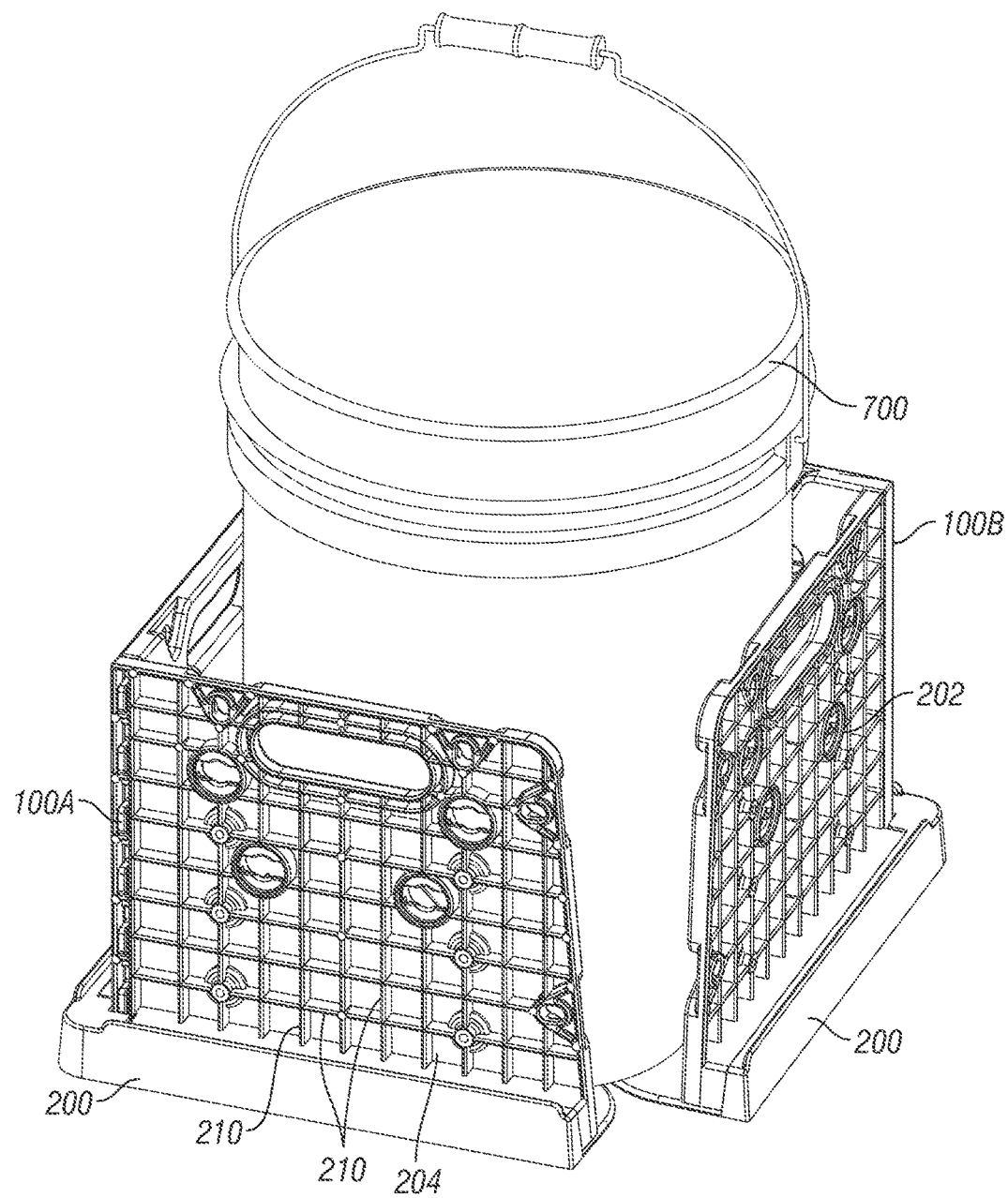
FIG. 7 is a top perspective view showing two cargo organizers containing a standard five-gallon bucket.

FIG. 7 shows the arrangement of FIG. 6 being used to cage a standard 5-gallon bucket 700. Bucket 700 may be filled with a liquid or tools or other articles, all of which will contribute to the weight that is borne by two adjacent bases 200. This weight will have a tendency to keep the organizers 100A, 100B from separating and will increase the frictional force that gripping pad 500 (FIGS. 3 and 5) will exert on the cargo hold substrate. Two or four cargo organizers 100 may also be used without any boards to cage larger articles. When the cargo organizers 100 are not being assembled together into a cargo containment system, the fingers 504 need not be inserted or used.

FIG. 8 depicts a board 110 as fastened to an exterior or rear surface 208 of vertical wall 202. FIG. 8A shows a frame of reference used herein to describe the illustrated embodiment. An x direction is right-to-left in FIG. 8, and is in the direction of the thickness of wall 202. "Forward" is to the left, and "rearward" is to the right. A representative finger axis X is aligned to the x direction. A y direction is horizontal and transverse, and is at right angles to the x direction. In FIG. 8, the y direction is normal to the paper. A z direction is vertical and is normal to both the x and y directions. This xyz frame of reference applies to wall 202 as shown. As applied to wall 204 (which mostly is a duplicate of wall 202, but at right angles to it), the xyz frame of reference would be rotated horizontally 90 degrees from the positions shown.

In the illustrated embodiment, a board channel 800 is made up of structure of both base 200 and wall 202. The base 200 defines a beveled wall channel 802 that accepts a beveled foot 804 of vertical wall 202. The exterior or rearward surface 208 of wall 202 conforms to a yz plane. From a bottom of exterior surface 208, a top surface 806 of the wall foot 804 extends rearwardly. Top surface 806 of wall 202 adjoins and is coplanar with a top surface 808 of the base 200. The surfaces 806 and 808 together make up an upward-facing surface 810 that receives an edge of board 110. A width of surface 810 in an x direction is a little greater than a predetermined thickness of board 110, which in turn can be ¾ in. The board-receiving surface 810 terminates rearwardly with an upstanding lip 812. The lower end of surface 208, surface 810 and lip 812 together comprise the board channel 800. Alternatively, the board channel 800 may be made up of structure of wall 202 alone, or of structure of base 200 alone.

To complete the attachment of a board 104, 106, 108 or 110 to an organizer 100, at least one, and in the illustrated embodiment two, camming fasteners or fingers 504 are used. In the illustrated embodiment, the fingers 504 are identical and interchangeably may be inserted into any finger hole 218 of any organizer 100. As assembled, finger 504 will be inserted into a selected finger hole 218 and both the finger hole 218 and the finger 504 will be disposed on or around an axis X, which is aligned to the x direction. The height of the finger hole axis X above upwardly-facing surface 810 is greater than the predetermined width of the (e.g.) board 110 to which it is provided to fasten. The finger 504 has three portions or sections: a forward portion 814 that in use is completely housed within wall 202 or 204, a central portion 816 that extends rearwardly from the plane of surface 208 and is joined to forward portion 814, and a blade portion 818 that is joined to and extends rearwardly from the central portion 816.

FIGS. 9A-9D show one embodiment of a finger 504 in detail. The forward portion 814 includes a t-bar 900. Arms 902 and 904 of t-bar 900 extend in opposite radial directions from axis X. A throat 906, of reduced radius relative to t-bar 900, connects the t-bar 900 to a forward flange 908. Each t-bar arm 902, 904 (the FIG. 9D detail only shows arm 904) has a rearward-facing surface 922 on which appears a finger detent 924. In the illustrated embodiment, the detent 924 is convex or male, is of limited yz extent and extends rearwardly from surface 922.

A length of the throat 906 (FIG. 9A) in an x direction is slightly greater than a thickness of wall web 211 near the vicinity of finger hole 218 (FIG. 8). The forward flange 908 (FIGS. 9A and 9B) can take the form of a disk and has a radius from axis X that is greater than that of throat 906.

Figure 9A:
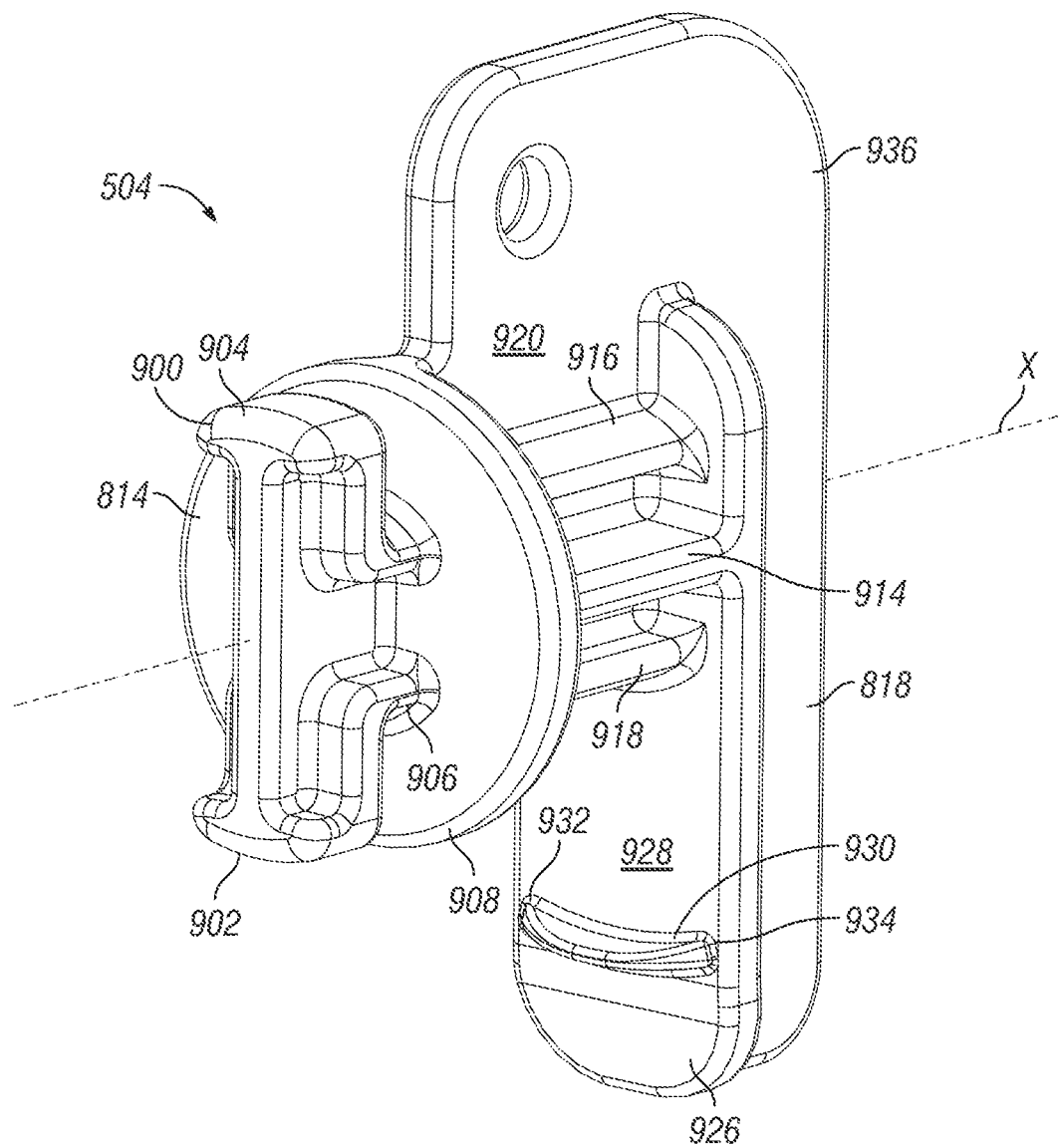
FIGS. 9A and 9B are perspective views, from different points of view, of a board-fastening finger according to the invention.
Figure 9B:
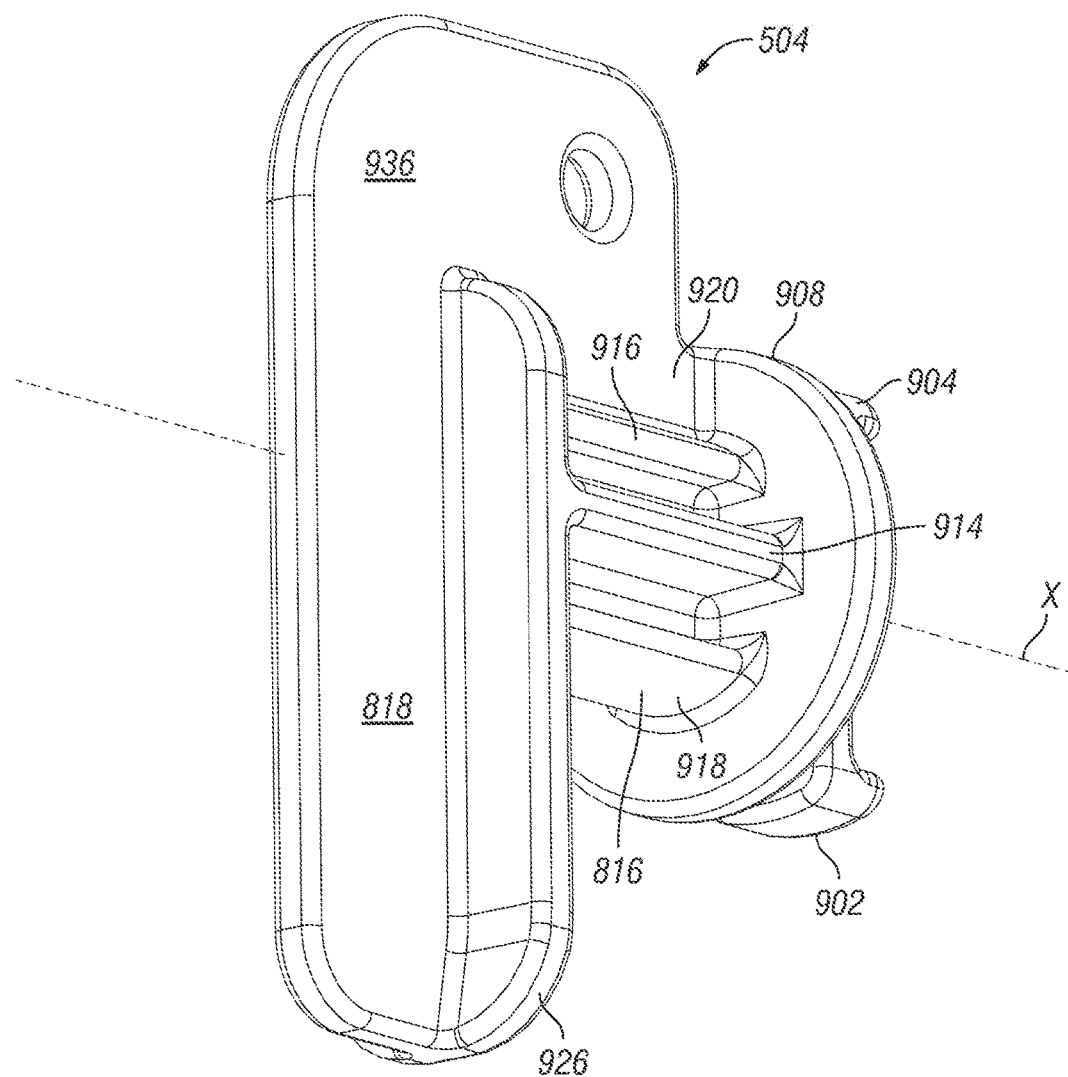
Figure 9C:
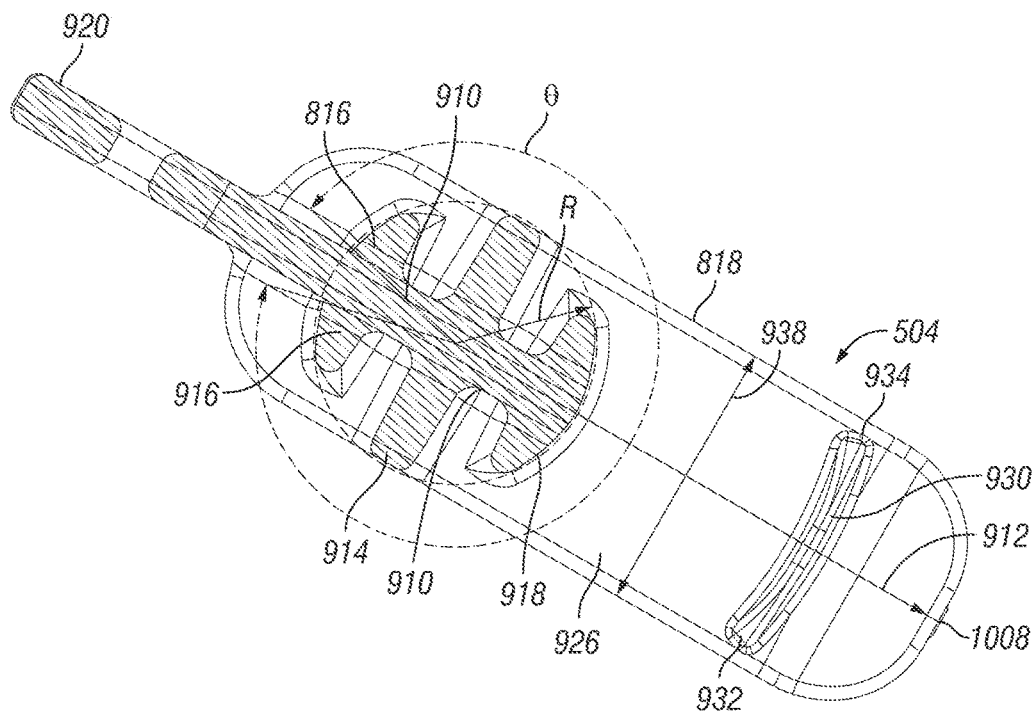
FIG. 9C is a sectional view, taken at 90 degrees from a finger axis, of the finger shown in FIGS. 9A and 9B.
Figure 9D:
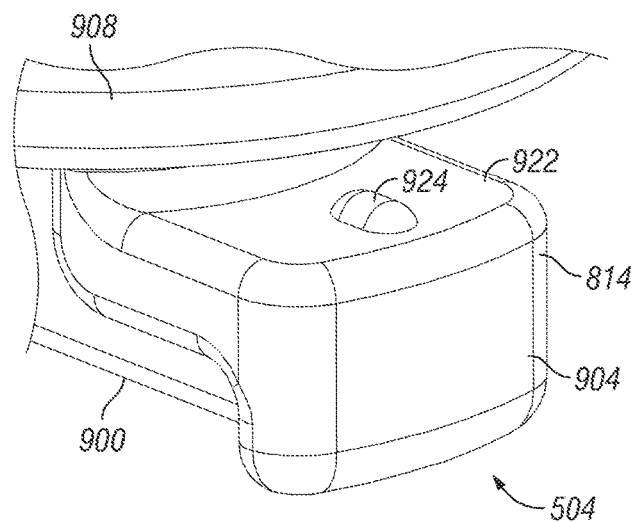
FIG. 9D is a magnified perspective detail of a t-bar arm of the finger shown in FIGS. 9A-9C.

In the illustrated embodiment, in which fingers 504 are injection-molded from a suitable plastic, the central portion 816 is formed by four ribs or webs each substantially conforming to a nominal thickness, for ease in moldability. As best seen in FIG. 9C, central portion 816 has a web 910 that extends from axis X in a predetermined radial direction 912. A middle web 914 intersects web 910 and extends from axis X in opposed directions, at a 90 degree angle to radial direction 912. An arcuate side web 916 and an arcuate side web 918 are spaced from axis X and are joined to middle web 914 by a web 910 that is aligned to direction 912 and substantially at right angles to webs 910, 914 and 916.

Most of the central portion 816 of the finger 504 is disposed at no more than a predetermined radius R from the axis X. The exception is a lever portion 920 that extends beyond radius R in a direction opposite that of predetermined radial direction 912. Nonetheless, central portion 816 is within radius R throughout a cylindrical sector θ around axis X. Sector θ should include the predetermined radial direction 912 and should subtend an arc of at least 90 degrees and more preferably at least 180 degrees. In the illustrated embodiment, sector θ subtends an arc of about 330 degrees. A height of axis X above upward-facing board channel surface 810 (see FIG. 8) should be greater than or equal to the sum of the predetermined board width and radius R. In alternative embodiments, such as ones in which finger 504 is formed by other means, the central portion 816 could be constituted by a hollow or solid cylinder of radius R. The radius from axis X of the forward flange 908 (FIGS. 9A and 9B) is substantially greater than radius R.

The blade portion 818 of the finger 504 (FIGS. 9A and 9B) has a rearward flange 926 that has a forward-facing surface 928 that substantially conforms to a yz plane. An elongate tooth 930 forwardly extends from surface 928. Tooth 930 may be triangular in axial section. The tooth 930 has opposed ends 932 and 934. A depth of tooth 930 in an x direction varies along its length, which is tangential to axis X. Each end 932, 934 is ramped such that the tooth depth at the ends 932, 934 is small, but then gradually increases toward the middle of the tooth. The tooth 930 may conform to an arc around axis X. A remainder of blade portion 818 may be constituted by a web 936 that is disposed at right angles to rearward flange 926 and which may be aligned and continuous with lever portion 920 of central portion 816.

As seen in FIG. 9C, rearward flange 926 extends in predetermined radial direction 912 by a length from axis X that is substantially greater than radius R. However, a width 938 of the rearward flange 926, taken at right angles to direction 912, is no more than 2R and is much less than the length of forward flange 926.

Figure 12:
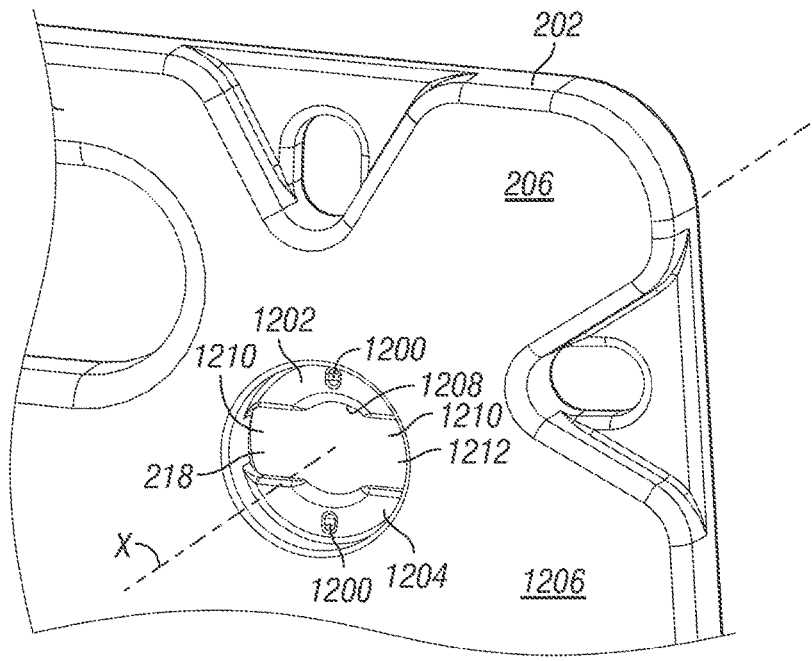
FIG. 12 is a perspective detail of the interior or front surface of a cargo organizer vertical wall, showing a finger-receiving recess.

While finger detents 924 (one shown in FIG. 9D) could cooperate with detents formed on the planar forward wall surface 206, in the illustrated embodiment and as shown in FIG. 12, cooperating detents 1200 are instead positioned on a floor 1202 of a cylindrical recess 1204 formed around finger hole 218. The detents 1200 should be of a shape that is complementary to finger detents 924; in the illustrated embodiment, the finger detents 924 are pegs, convex or male, and therefore recess detents 1200 are concave or female. Alternatively, the detenting structure could be reversed. In the illustrated embodiment, wall front surface 206 includes the floor 1202 as rearwardly spaced from a general planar front surface 1206. The finger hole 218 takes the form of a central circular opening 1208 and opposed wings 1210 of an elongate slot 1212 that extend in opposite directions from the opening 1208. The wings 1210 of slot are sized to receive the opposed arms 902, 904 of the finger t-bar 900. In alternative embodiments, the size and shape of the t bar 900 could be changed, and the size and shape of the slot 1212 would then be changed commensurately. Slot 1212 is elongate in a predetermined angular direction (here, horizontal) and the recess detents 1200 are angularly displaced from slot 1212. In the illustrated embodiment, the detents 1200 are arranged on a z axis that intersects axis X and are each 90 degrees displaced from slot 1212.

The depth of finger hole recess floor 1202 from general surface 1206 should be deep enough to house t-bar 900.

Figure 10:
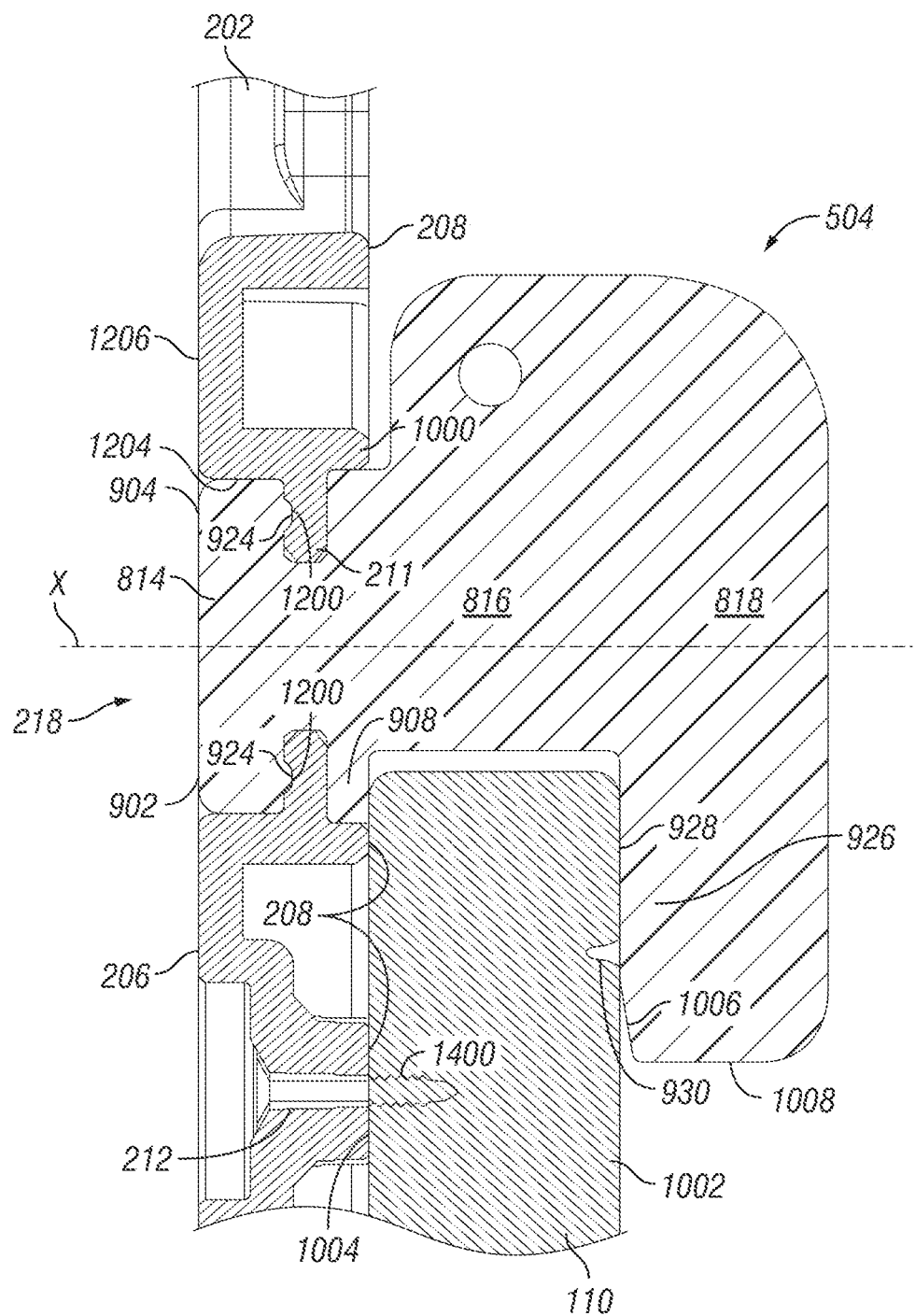
FIG. 10 is a magnified sectional detail of FIG. 8, showing a finger and associated wall structure in more detail.

FIG. 10 shows a finger 504 with its blade 818 aligned with the z direction. In this condition, the finger 504 will fasten the board 110 to the rear surface 208 of the wall 202. Male finger detents 924 fall into female wall detents 1200, providing an element of resistance to further rotation of finger 504 around axis X. The rear wall surface 208 includes a ring 1000 that surrounds and houses the finger front flange 908. When blade portion 818 is turned downward to the position shown, the interference of tooth 930 with an outer side 1002 of the board 110 is at the maximum. The interference fit may cause the lower end of blade 818 to flex rearwardly from the position shown, and/or tooth 930 may slightly score the otherwise planar outer surface 1002 of board 110.

An opposed, front board side 1004 makes contact with a rearward surface of front flange 908. As long as the board 110 maintains a vertical position within board channel 800, board side 1004 will bear against front flange 908, preventing finger 504 from falling out of the ring 1000. This condition will obtain even where the finger 504 has been turned such that its blade portion 818 is in a horizontal position (see FIG. 11). Hence, the user may turn the blade portion(s) 818 until it or they are horizontal, and slide the board 110 along the board channel 800 in a y direction to a new position, while still restraining the separation of the finger(s) 504 from wall 202.

As best seen in FIG. 10, the forward-facing surface 928 of the rearward flange 926 is rearwardly feathered at 1006 toward its distal end 1008, to help ease finger 504 past a board edge as it is being turned downward.

Figure 13A:
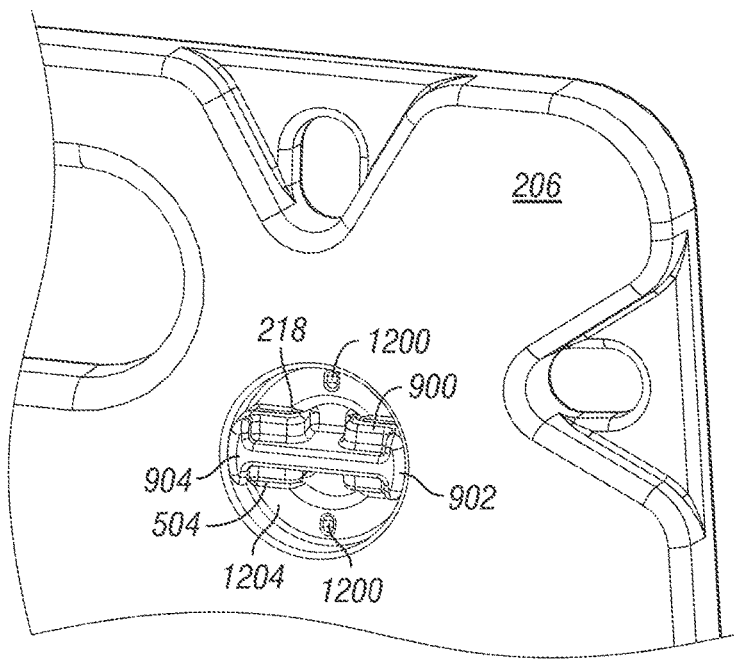
FIGS. 13A and 13B are perspective views of the interior or front surface of a cargo organizer vertical wall, respectively showing an inserted finger at a horizontal position and at a vertical, fastening position.
Figure 13B:
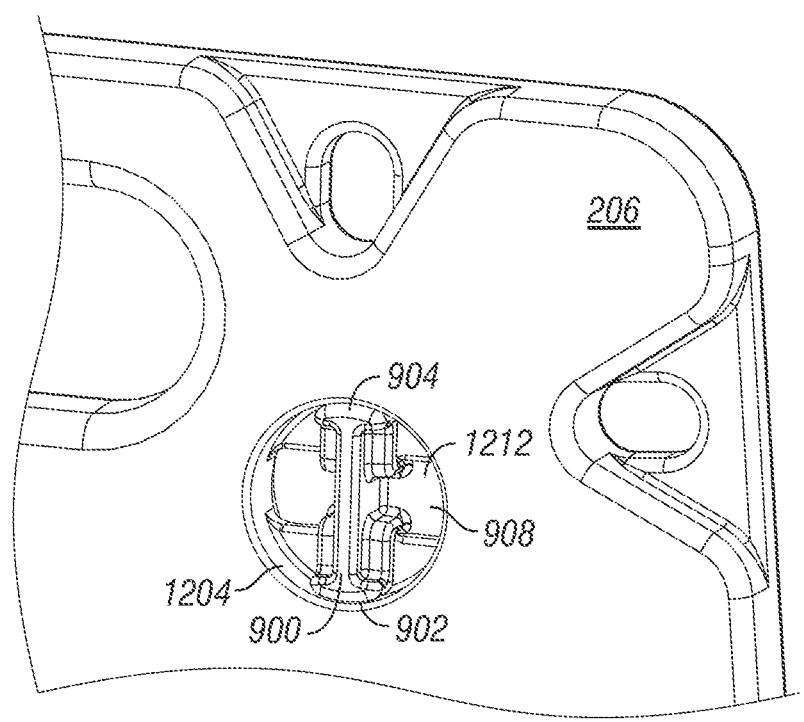

FIG. 13A shows the position of a finger 504 after it has been inserted into a selected finger hole 218 but before finger 504 is turned downward. In this horizontal position the "t" bar 900 fits through slot 1212. FIG. 13B shows that the orientation of t-bar 900 is vertical when finger 504 is turned downward. In this condition, the detents 924 of the t-bar 900 click into the detents 1200 disposed in recess 1204.

Successive steps of attachment of a board 110 to an organizer 100 are shown in FIGS. 14A-14E. In the illustrated embodiment, each vertical wall 202, 204 of the cargo organizer 100 is furnished with four finger holes 218A-D. Finger holes 218A and 218B have axes that are at a first elevation above board-receiving surface 810 and are provided to retain a 1×6 board. Finger holes 218C and 218D have axes that are at a second, lower elevation above board-receiving surface 810 and are provided to retain a 1×4 board. In this example, a 1×6 board will be assembled to cargo organizer 100, and as such a user selects finger holes 218A and 218B for use. Finger holes 218C and 218D won't be used. Fingers 504A and 504B are oriented in a horizontal position but have not yet been inserted into finger holes 218A and 218B.

Figure 14A:
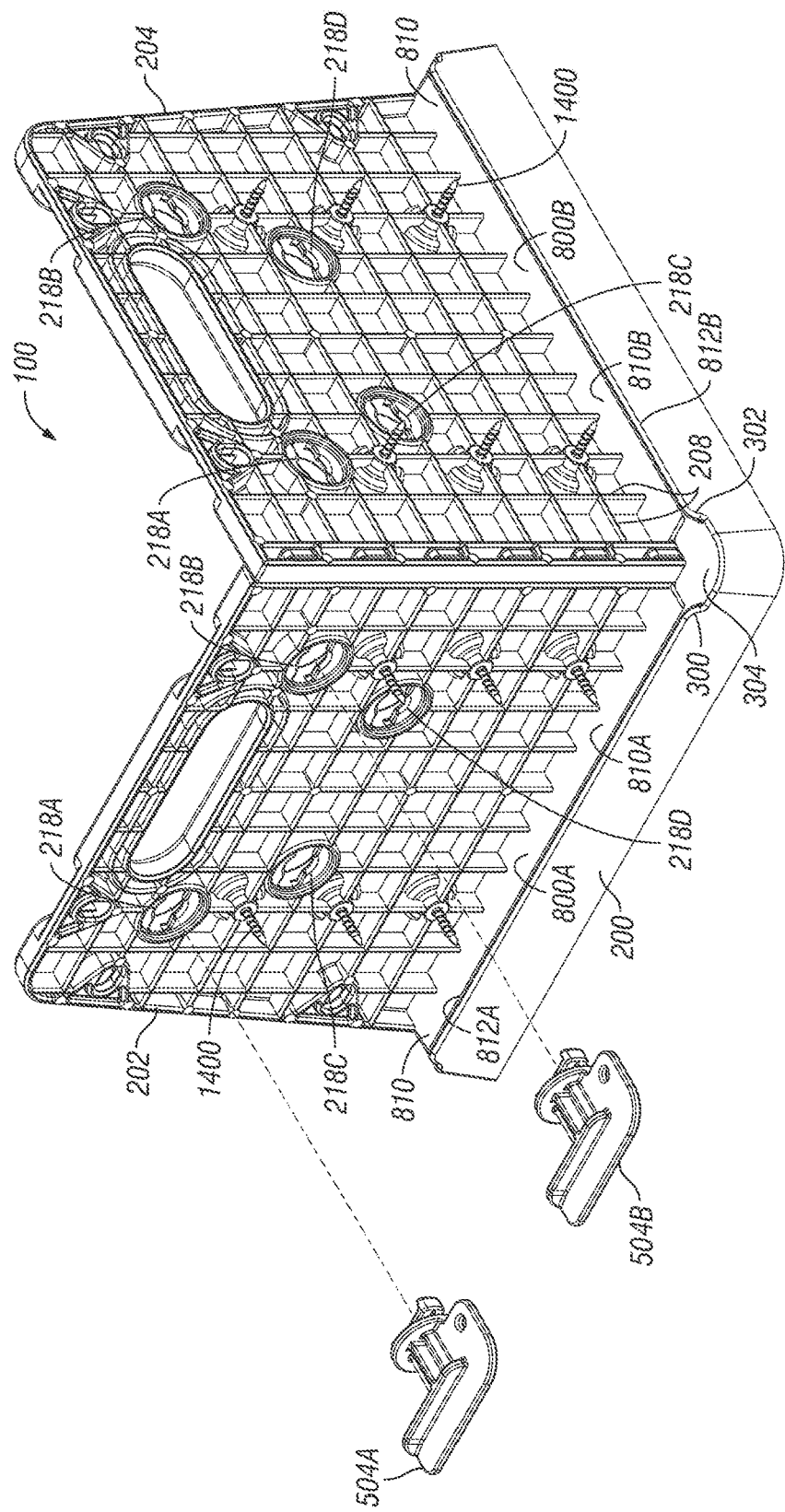
Figure 14B:
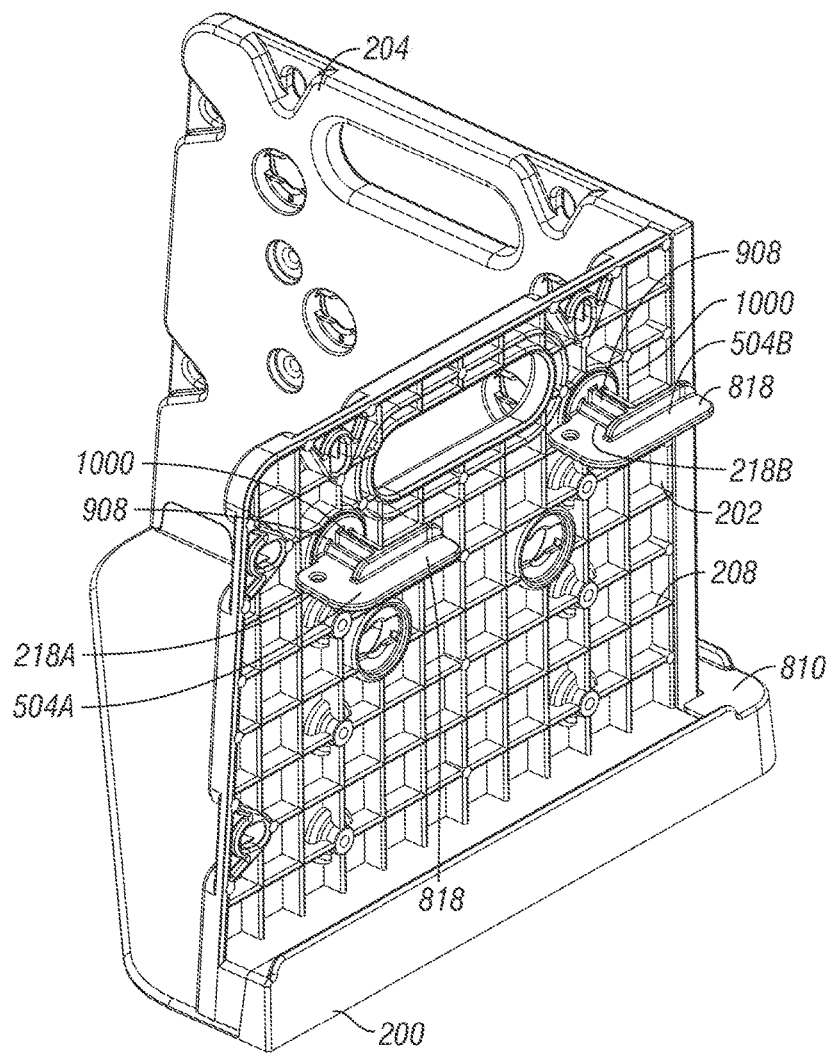

In FIG. 14B, the finger 504A is inserted into finger hole 218A and finger 504B is inserted into finger hole 218B. The t-bars 900 of each of the fingers 504A, 504B will pass through slots 1212 (see FIG. 12) of the finger holes 218A and 218B. The forward flanges 908 of the fingers 504A and 504B will be housed in rings 1000 surrounding the finger holes 218A and 218B at the rear surface 208, as best seen in FIG. 10.

Figure 14C:
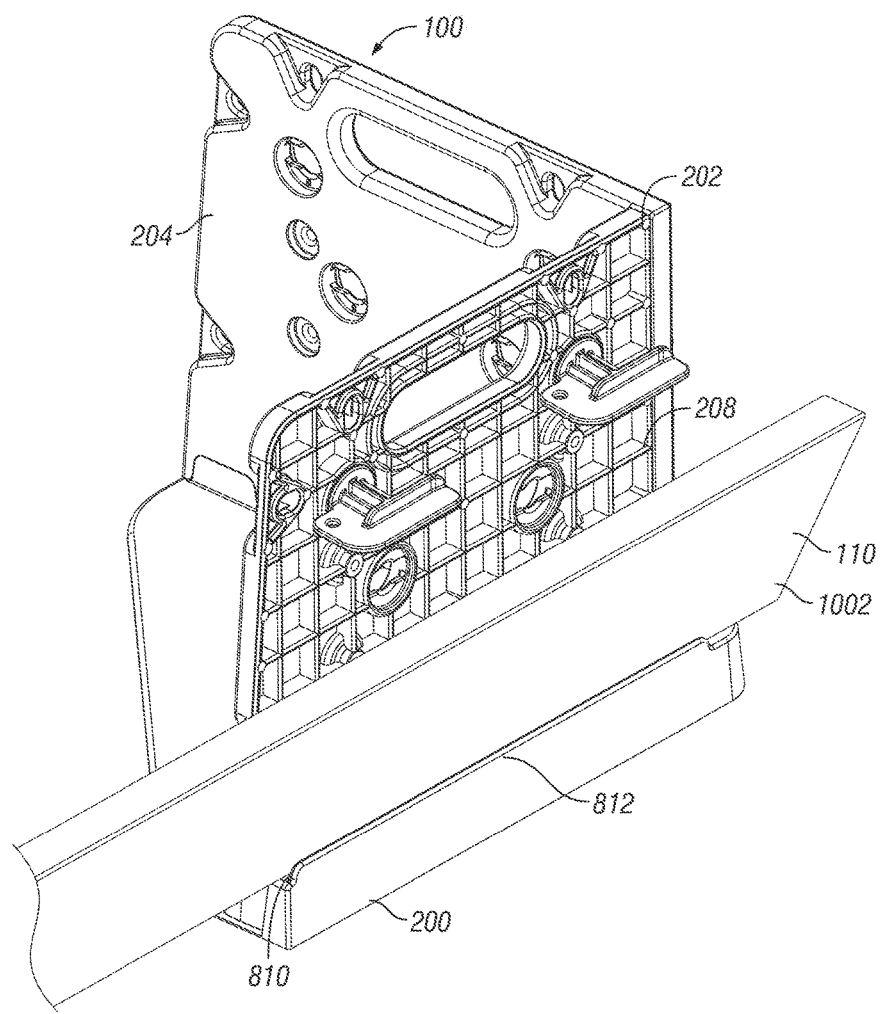

In FIG. 14C, a board 110 has been selected for assembly to the organizer 100. A bottom edge of the board 110 is placed on board channel surface 810 so that it is frontward of retaining lip 812.

In FIG. 14D, the board 110 is rotated so that its width is aligned with the z direction. A forward side 1004 of board 110 will the abut rear surface 208 of the wall 202. The blade portions 818 of the fingers 504A, 504B will be positioned rearwardly of board outer surface 1002. The steps shown in FIGS. 14C and 14D are also shown in FIG. 11. After rotation to a vertical position, the forward side 1004 of the board 110 will abut against forward finger flanges 908, preventing fingers 504A and 504B from falling out of holes 218A and 218B.

Figure 14E:
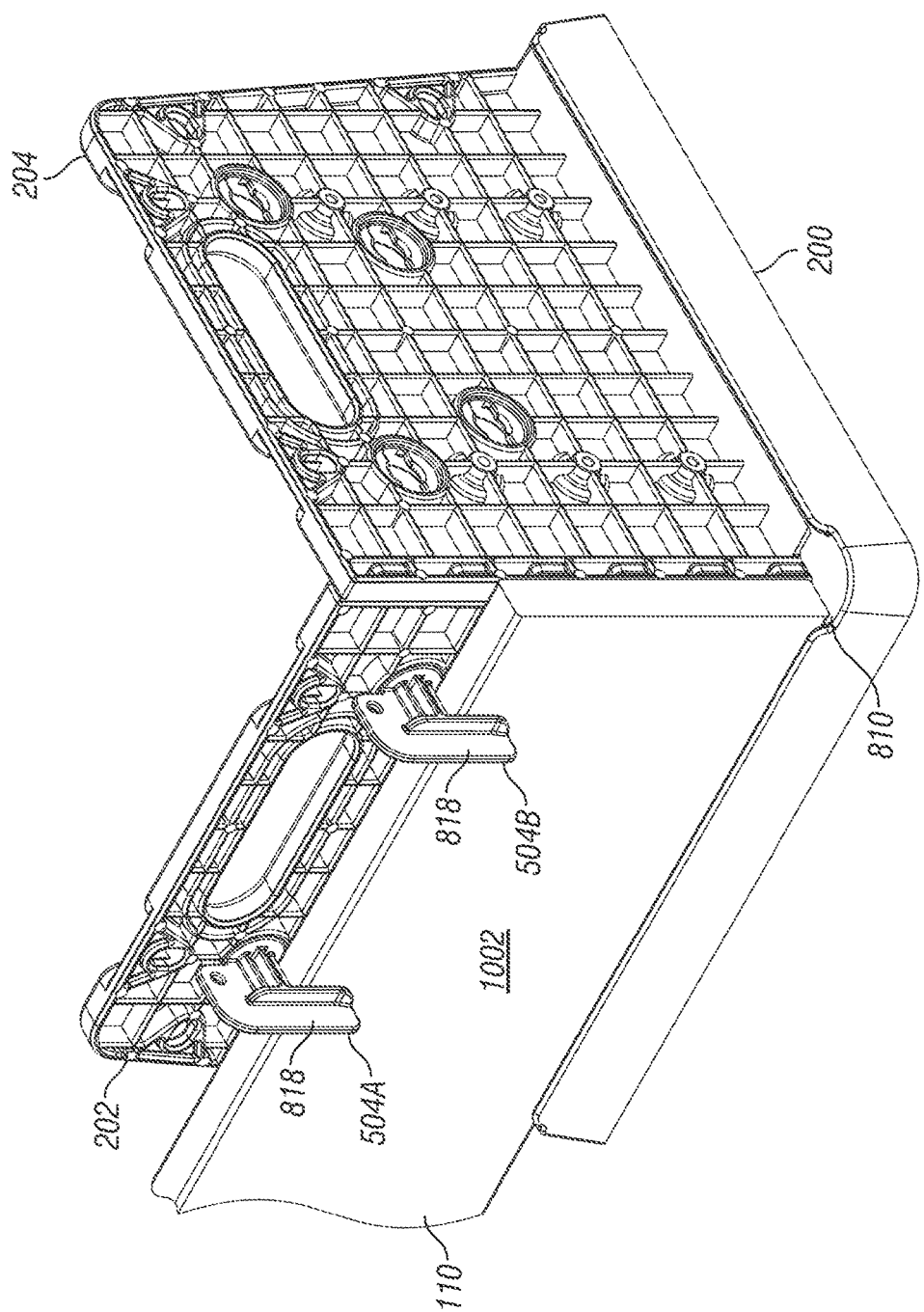

In FIG. 14E, the user has downwardly rotated each finger blade portion 818 until portion 818 is pointed downward. This rotation causes finger detents 924 to click into wall detents 1200 (FIG. 10), causes tooth 930 to press against outer board side 1002 in an interference fit, and secures board 110 to the organizer 100. These steps are repeated to secure up to four boards to up to four organizers 100 using up to eight fingers 504.

After one or more of the boards 104-110 have been secured to the cargo organizers 100, a user may optionally may make this attachment permanent by installing screws 1400 into one or more of the screw holes 212. FIG. 14A shows screws 1400 in the positions they would assume in affixing boards to the organizer 100. For a 1×6 board, up to six screws may be inserted into respective screw holes 212 in any particular wall 202 or 204. For a 1×4 board, up to four such screws may be used, in the lower two ranks of the screw holes 212. FIG. 10 shows one such screw 1400 inserted through a screw hole 212 and screwed into board 110.

Figure 15:
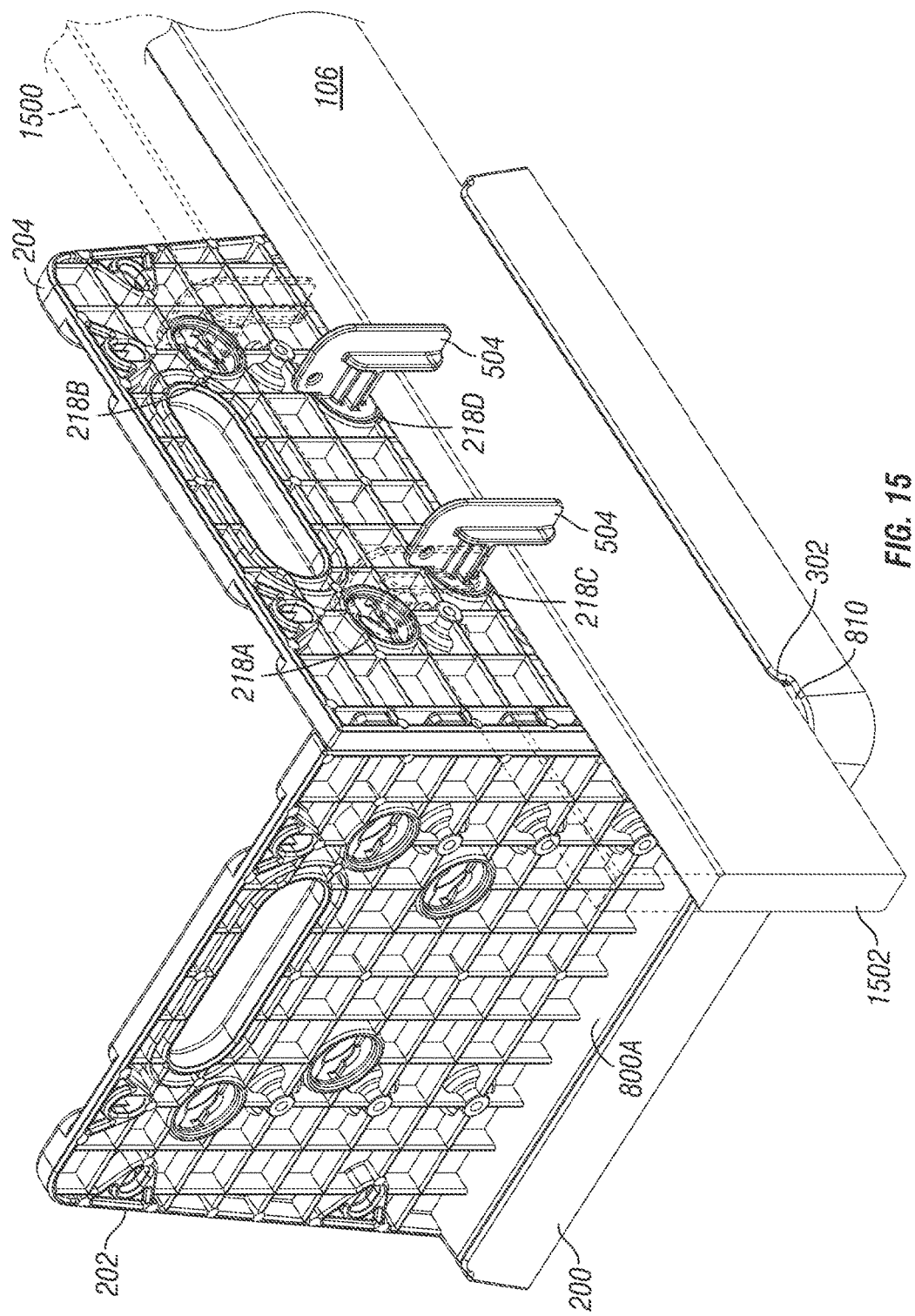
FIG. 15 is a rear view of a cargo organizer showing assembly to boards of either of two standard board widths.

FIG. 15 schematically illustrates the assembly of a 1×4 board 106 to a vertical wall 204, or alternatively the assembly of a 1×6 board 1500 (shown in phantom) to wall 204. To fasten a 1×6 board 1500, finger holes 218A and 218B are used, whose axes are at a height above channel surface 810 that is greater than or equal to the predetermined width of board 1500 (5½") plus radius R. Alternatively, to fasten a 1×4 board 106 to wall 204, finger holes 218C and 218D are used, whose axes are at a height above channel surface 810 that is greater than or equal to the predetermined width of board 106 (3½") plus radius R. Only two fingers 504A, 504B are used in one selected pair of the holes 218A-D.

As seen in FIG. 14A, vertical wall 202 has an associated board channel 800A with an upward-facing, board-receiving surface 810A. Wall 204, which is disposed at an angle to wall 202, has an associated board channel 800B with an upward-facing, board-receiving surface 810B. Board channel 800A is parallel to wall 202 while board channel 800B is parallel to wall 204. Once walls 202 and 204 are assembled to base 200, a lip 812A of channel 800A has an end 300 that is disposed forward of the vertical plane of the outer surface 208 of wall 204. Likewise, a lip 812B of channel 800B has an end 302 that is disposed forward of the vertical plane occupied by outer surface 208 of wall 202. The board-receiving surfaces 810A, 810B run beyond lip ends 300, 302 to merge in a horizontal corner surface 304.

The open ends of channels 800A, 800B where they intersect permit the organizer 100 to be assembled to other organizers 100 with boards that are longer than the desired sides of cargo containment system 102. FIG. 15 shows a 1×6 board 110 whose left end 1502 sticks out well beyond the board 106's intersection with board channel 800A. In FIG. 16, a board 106 (rendered transparent so as not to obscure underlying structure) has been fastened to wall 204 such that its left end 1600 extends far beyond the position of intersecting board channel 800A. Since lip end 300 is positioned to the right (in this FIGURE) of the board channel intersection, it will not interfere with this board placement. A second board 110 may be assembled to wall 202 such that its right end 1602 abuts the side of board 106. Organizer 100 also permits a reverse situation, in which the right end of board 110 is disposed to the right (in this FIGURE) of the position of board channel 800B. The open-ended channel corner of organizer 100 further permits the user to lengthen or shorten parallel sides of the box forming cargo containment system 102 until the article or articles contained therein are closely caged.

In summary, an improved cargo organizer has been shown and described that is capable of assembly into a cargo containment system with different sizes of lumber by the employment of fastening fingers, and which can also be used without connecting pieces to contain articles within a cargo area of a vehicle.

While illustrated embodiments of the present invention have been described and illustrated in the appended drawings, the present invention is not limited thereto but only by the scope and spirit of the appended claims.

I claim:
1. A cargo organizer adapted to be assembled to a board having a predetermined board width and a predetermined board thickness, the cargo organizer comprising:
a vertical wall aligned to a yz plane and having an inner surface adapted to receive an item of cargo and an outer surface opposed to the inner surface and displaced therefrom in an x direction, the x direction being horizontal, a y direction being horizontal and at right angles to the x direction, a z direction being vertical;
a board channel extending outwardly in alignment to the x direction from the outer surface of the vertical wall and defining an upwardly facing surface for receiving the board;
a finger hole formed through the vertical wall to extend inwardly from the outer surface of the vertical wall, an axis of the finger hole aligned with the x direction and having a height above the upwardly facing surface of the board channel that is greater than the predetermined board width;
a finger inserted into the finger hole to be disposed on and rotatable around the axis, the finger having a forward portion extending forwardly from the outer surface of the vertical wall, a central portion joined to the forward portion and extending rearwardly from the outer surface of the vertical wall, and a blade portion joined to the central portion and extending rearwardly therefrom;
the central portion having a thickness from the axis that is no more than a predetermined radius throughout an axial sector that extends for at least 90 degrees around the axis and that includes a predetermined radial direction, a length of the central portion along the axis between the forward portion and the blade portion being greater than the predetermined board thickness;
the blade portion having a radial length in the predetermined radial direction from the axis that is greater than the predetermined radius, a width of the blade portion at right angles to the length of the blade portion being no more than twice the predetermined radius, such that when the finger is rotated so that the predetermined radial direction is downward, the finger will capture the board, and such that when the finger is rotated such that the predetermined radial direction is horizontal, the board may be disassembled from the organizer.

2. The cargo organizer of claim 1, wherein the blade portion of the finger has a rearward flange, substantially oriented in a yz plane, with a forward facing surface, a tooth extending forwardly from the forward facing surface, the tooth adapted to engage a board surface, the tooth being elongate in a direction tangential to the axis and having first and second opposed ends, each end of the tooth being ramped such that a height of the tooth in the x direction is reduced at the end of the tooth.

3. The cargo organizer of claim 2, wherein the tooth is formed as a solid of rotation through a predetermined arc around the axis.

4. The cargo organizer of claim 1, wherein the blade portion of the finger has a rearward flange substantially oriented in a yz plane, the rearward flange having a forward facing surface, most of the forward facing surface conforming to a yz plane, the rearward flange having a distal end, the forward facing surface being feathered in a rearward direction toward the distal end of the rearward flange.

5. The cargo organizer of claim 1, wherein a width of the board channel in the x direction is greater than the predetermined board thickness.

6. The cargo organizer of claim 1, wherein the height of the axis above the upwardly facing surface of the board channel is greater than the sum of the predetermined board width and the predetermined radius of the central portion of the finger.

7. The cargo organizer of claim 1, wherein the axial sector throughout which the thickness of the central portion of the finger does not exceed the predetermined radius subtends an arc of at least 180 degrees around the axis.

8. The cargo organizer of claim 1, wherein the finger hole is one of first and second finger holes formed through the vertical wall, the predetermined board width being one of first and second predetermined board widths, the first and second finger holes being vertically spaced apart from each other and formed around respective first and second axes disposed in parallel to each other and in an x direction, a height of the first axis above the upwardly facing surface of the board channel being greater than the first predetermined board width, a height of the second axis above the upwardly facing surface of the board channel being greater than the second predetermined board width, such that the cargo organizer may be assembled to either a first board having the first predetermined board width or to a second board having the second predetermined board width.

9. The cargo organizer of claim 1, wherein the finger hole is one of first and second finger holes formed in the vertical wall, the first and second finger holes being horizontally spaced apart from each other, the first and second finger holes being formed around respective first and second axes disposed in parallel to each other and in an x direction, a height of each axis above the upwardly facing surface of the board channel being greater than the predetermined board width.

10. The cargo organizer of claim 9, further comprising third and fourth finger holes formed in the vertical wall respectively around third and fourth axes disposed in parallel to each other and in an x direction, the cargo organizer adapted to be fastened to a first board having a first predetermined width or to a second board having a second predetermined board width smaller than the first predetermined board width, a height of the first and second axes above the upwardly facing surface of the board channel being greater than the first predetermined board width, a height of third and fourth axes above the upwardly facing surface of the board channel being greater than the second predetermined board width.

11. The cargo organizer of claim 10, wherein the finger is one of first and second fingers, the first finger insertable into one of the first and third finger holes, the second finger insertable into one of the second and fourth finger holes.

12. The cargo organizer of claim 1, wherein a recess is formed in the inner surface of the vertical wall around the finger hole, a floor of the recess spaced rearwardly from the inner surface of the vertical wall, an elongate slot formed in the floor of the recess and communicating to the outer surface of the vertical wall;

the forward portion of the finger forwardly terminating in a t-bar, the t-bar insertable through the slot in the recess in a first angular orientation with respect to the axis but not insertable through the slot in the recess in a second angular orientation with respect to the axis, rotation of the finger after the forward portion of the finger has been inserted into the finger hole causing the t-bar to be angularly displaced from the slot and preventing the removal of the finger from the vertical wall.

13. The cargo organizer of claim 1, wherein the finger hole includes an elongate slot, the forward portion of the finger including a t-bar insertable through the elongate slot in a first angular orientation to the axis and not insertable through the elongate slot in a second angular orientation to the axis;

the t-bar having a rearward-facing surface, a finger detent formed on the rearward-facing surface, a wall detent formed on the inner surface of the vertical wall to be angularly spaced from the slot, the wall detent and the finger detent having complementary shapes, rotation of the finger by a predetermined amount after the finger is inserted into the finger hole causing the engagement of the finger detent with the wall detent, thereby providing resistance to further rotation of the finger in the finger hole.

14. The cargo organizer of claim 13, wherein the inner surface of the vertical wall has a planar general surface and a recess formed in the general surface around the finger hole, a floor of the recess being rearwardly displaced from the general surface, the wall detent being formed on the floor of the recess.

15. The cargo organizer of claim 13, wherein the t-bar has first and second opposed arms extending from the axis in opposite directions, the rearward-facing surface of the t-bar being one of first and second rearward-facing surfaces, the first rearward-facing surface being a surface of the first arm, the second rearward-facing surface being a surface of the second arm, the finger detent being one of first and second finger detents, the first finger detent formed on the first rearward-facing surface and the second finger detent formed on the second rearward-facing surface, the wall detent being one of first and second wall detents formed on the inner surface of the vertical wall to be angularly spaced from each other and from the slot, the first finger detent adapted to engage with the first wall detent and the second finger detent adapted to engage with the second wall detent to provide resistance to further rotation of the finger.

16. The cargo organizer of claim 1, wherein the board has a length at right angles to the predetermined width and the predetermined thickness, the vertical wall being one of a first vertical wall and a second vertical wall joined at an angle to the first vertical wall, the board channel being one of a first board channel and a second board channel formed at the angle to the first board channel, ends of the first and second board channels being open so as to each accommodate a board having ends displaced beyond the organizer in opposed directions.

17. The cargo organizer of claim 16, wherein the first and second vertical walls are affixed to upwardly extend from a horizontal base, the first and second vertical walls each having first and second opposed ends, the first ends of the first and second vertical walls being joined to each other;

the base being substantially triangularly shaped, a first side of the base positioned in parallel to the first vertical wall, a second side of the base positioned in parallel to the second vertical wall, a third side of the base being substantially straight and joining the first and second sides of the base.

\* \* \* \* \*